(12) United States Patent
Caspall

(10) Patent No.: US 12,306,353 B2
(45) Date of Patent: May 20, 2025

(54) BEAMFORMING SONAR SYSTEMS FOR 360-DEGREE LIVE SONAR, AND ASSOCIATED METHODS

(71) Applicant: Navico, Inc., Tulsa, OK (US)

(72) Inventor: Jayme J. Caspall, Tulsa, OK (US)

(73) Assignee: Navico, Inc., Tulsa, OK (US)

( * ) Notice: Subject to any disclaimer, the term of this patent is extended or adjusted under 35 U.S.C. 154(b) by 168 days.

(21) Appl. No.: 18/140,990

(22) Filed: Apr. 28, 2023

(65) Prior Publication Data

US 2024/0361439 A1 Oct. 31, 2024

(51) Int. Cl.
*G01S 7/521* (2006.01)
*G01S 15/89* (2006.01)

(52) U.S. Cl.
CPC .............. *G01S 7/521* (2013.01); *G01S 15/89* (2013.01)

(58) Field of Classification Search
CPC .......... G01S 7/521; G01S 15/89; G01S 7/524; G01S 15/8902; G01S 15/93; G01S 15/96
See application file for complete search history.

(56) References Cited

U.S. PATENT DOCUMENTS

| | | | |
|---|---|---|---|
| 4,425,635 A | 1/1984 | Yamamoto et al. | |
| 5,025,425 A * | 6/1991 | Suter | G01S 15/50 367/96 |
| 5,311,095 A | 5/1994 | Smith et al. | |
| 5,329,496 A | 7/1994 | Smith | |
| 5,548,564 A | 8/1996 | Smith | |
| 5,744,898 A | 4/1998 | Smith et al. | |
| 5,923,617 A | 7/1999 | Thompson et al. | |
| 6,520,105 B2 | 2/2003 | Koda et al. | |
| 6,678,210 B2 * | 1/2004 | Rowe | G10K 11/343 367/102 |
| 7,035,166 B2 | 4/2006 | Zimmerman et al. | |
| 7,106,656 B2 | 9/2006 | Lerro et al. | |

(Continued)

FOREIGN PATENT DOCUMENTS

| | | |
|---|---|---|
| AU | 2004258175 B2 | 9/2009 |
| AU | 2009283312 B8 | 6/2015 |

(Continued)

OTHER PUBLICATIONS

CN-109959914-A (machine translation) (Year: 2019).*

(Continued)

*Primary Examiner* — Yuqing Xiao
*Assistant Examiner* — Christopher Richard Walker
(74) *Attorney, Agent, or Firm* — Nelson Mullins Riley & Scarborough LLP

(57) ABSTRACT

A system is provided for imaging an underwater environment. The system includes at least six arrays of transducer elements. Each array is operated at a fixed phase shift and varies in frequency so as to beamform multiple sonar return beams of a first range of angles and a second range of angles. The arrays can be oriented to create arcs of sonar coverage extending at various angles from a watercraft. Accordingly, the at least six arrays can be positioned in a configuration such that a 360-degree live sonar image can be formed. Additionally or alternatively, the at least six arrays can be used to form partial (i.e., less than 360-degree) live sonar images, and the partial live sonar images can be updated or adjusted based on user input and/or desired object(s).

19 Claims, 19 Drawing Sheets

(56) References Cited

U.S. PATENT DOCUMENTS

| | | |
|---|---|---|
| 7,123,546 B2 | 10/2006 | Zimmerman et al. |
| 7,173,879 B2 | 2/2007 | Zimmerman et al. |
| 7,330,399 B2 | 2/2008 | Lerro et al. |
| 7,355,924 B2 | 4/2008 | Zimmerman et al. |
| 7,453,769 B2 | 11/2008 | Kirschner et al. |
| 7,542,376 B1 | 6/2009 | Thompson et al. |
| 7,542,377 B2 | 6/2009 | Kirschner et al. |
| 7,606,114 B2 | 10/2009 | Bachelor et al. |
| 7,847,925 B2 | 12/2010 | Vogt |
| 7,852,709 B1 | 12/2010 | Lerro et al. |
| 7,889,600 B2 | 2/2011 | Thompson et al. |
| 7,957,609 B2 | 6/2011 | Lu et al. |
| 8,254,208 B2 | 8/2012 | Vogt |
| 8,300,499 B2 | 10/2012 | Coleman et al. |
| 8,345,511 B1 | 1/2013 | Rikoski |
| 8,514,659 B2 | 8/2013 | Vogt |
| 8,638,362 B1 | 1/2014 | Thompson et al. |
| 8,645,012 B2 | 2/2014 | Salmon et al. |
| 8,717,847 B2 | 5/2014 | Blake |
| 8,761,976 B2 | 6/2014 | Salmon et al. |
| 8,811,120 B2 | 8/2014 | Bachelor et al. |
| 8,814,795 B2 | 8/2014 | Derode et al. |
| 8,940,312 B2 | 1/2015 | Hayashi et al. |
| RE45,379 E | 2/2015 | Rowe |
| 8,964,507 B2 | 2/2015 | Bachelor et al. |
| 9,132,900 B2 | 9/2015 | Salmon et al. |
| 9,135,731 B2 | 9/2015 | Lauenstein et al. |
| 9,182,486 B2 | 11/2015 | Brown et al. |
| RE45,823 E | 12/2015 | Vogt |
| 9,218,799 B2 | 12/2015 | Stytsenko et al. |
| 9,322,915 B2 * | 4/2016 | Betts ................. G01S 15/8902 |
| 9,386,964 B2 | 7/2016 | Bagge |
| 9,664,783 B2 | 5/2017 | Brown et al. |
| 9,739,884 B2 | 8/2017 | Proctor et al. |
| 9,766,328 B2 | 9/2017 | Black et al. |
| 9,784,825 B2 | 10/2017 | Brown et al. |
| 9,784,826 B2 | 10/2017 | Matson et al. |
| 9,784,832 B2 | 10/2017 | Proctor et al. |
| 9,812,118 B2 | 11/2017 | Matson et al. |
| 9,840,312 B1 | 12/2017 | Clark |
| 9,846,232 B1 | 12/2017 | Thompson et al. |
| 9,947,309 B2 | 4/2018 | Stokes et al. |
| 10,012,731 B2 | 7/2018 | Pelin et al. |
| 10,019,002 B2 | 7/2018 | Harnett et al. |
| 10,067,228 B1 | 9/2018 | Steenstrup et al. |
| 10,107,908 B2 | 10/2018 | Betts et al. |
| 10,114,119 B2 | 10/2018 | Horner et al. |
| 10,197,674 B2 | 2/2019 | Thompson et al. |
| 10,215,849 B2 | 2/2019 | Kozuki |
| 10,241,200 B2 | 3/2019 | Sayer et al. |
| 10,247,832 B2 | 4/2019 | Serafino et al. |
| 10,310,062 B2 | 6/2019 | Coleman et al. |
| 10,311,715 B2 | 6/2019 | Jopling |
| 10,365,356 B2 | 7/2019 | Stokes et al. |
| 10,365,366 B2 | 7/2019 | Lauenstein |
| 10,408,933 B1 | 9/2019 | DeHart et al. |
| 10,502,820 B2 | 12/2019 | Zimmerman et al. |
| 10,514,451 B2 | 12/2019 | Brown et al. |
| 10,545,226 B2 | 1/2020 | Wigh et al. |
| 10,545,235 B2 | 1/2020 | Pelin et al. |
| 10,605,913 B2 | 3/2020 | Coleman et al. |
| 10,852,429 B2 | 12/2020 | Gatland |
| 10,890,660 B2 | 1/2021 | Wigh et al. |
| 10,914,810 B2 | 2/2021 | Laster et al. |
| 11,059,556 B2 | 7/2021 | Ahlgren |
| 11,125,866 B2 | 9/2021 | Sumi et al. |
| 11,249,176 B2 | 2/2022 | Hooper |
| 11,435,427 B2 | 9/2022 | Laster et al. |
| 11,500,054 B2 | 11/2022 | Clark |
| 11,762,090 B2 * | 9/2023 | Simonton ................. G01S 15/96 367/93 |
| 2003/0235112 A1 | 12/2003 | Zimmerman et al. |
| 2005/0007882 A1 | 1/2005 | Bachelor et al. |
| 2007/0159922 A1 | 7/2007 | Zimmerman et al. |
| 2009/0037040 A1 | 2/2009 | Salmon et al. |
| 2010/0067330 A1 | 3/2010 | Collier et al. |
| 2010/0074057 A1 | 3/2010 | Bachelor et al. |
| 2010/0284248 A1 | 11/2010 | Wang et al. |
| 2011/0013485 A1 | 1/2011 | Maguire |
| 2014/0013270 A1 | 1/2014 | Thomas et al. |
| 2014/0013276 A1 | 1/2014 | Butterworth |
| 2014/0050051 A1 | 2/2014 | Vogt |
| 2014/0071059 A1 | 3/2014 | Girault |
| 2014/0092709 A1 | 4/2014 | Miller et al. |
| 2014/0096060 A1 | 4/2014 | Thomas et al. |
| 2014/0258935 A1 | 9/2014 | Nishida et al. |
| 2014/0336854 A1 | 11/2014 | Salmon et al. |
| 2015/0142211 A1 | 5/2015 | Shehata et al. |
| 2016/0054733 A1 | 2/2016 | Hollida et al. |
| 2016/0061951 A1 | 3/2016 | Brown et al. |
| 2016/0214715 A1 | 7/2016 | Meffert |
| 2016/0259049 A1 * | 9/2016 | Proctor ................. G01S 15/876 |
| 2016/0259050 A1 | 9/2016 | Proctor et al. |
| 2016/0259051 A1 | 9/2016 | Proctor et al. |
| 2016/0259052 A1 | 9/2016 | Kirmani |
| 2016/0306040 A1 | 10/2016 | Hunt et al. |
| 2016/0341827 A1 | 11/2016 | Horner et al. |
| 2017/0003102 A1 | 1/2017 | Sparling |
| 2017/0031023 A1 | 2/2017 | Ivanov |
| 2017/0038344 A1 | 2/2017 | Capus et al. |
| 2017/0212230 A1 | 7/2017 | Wigh et al. |
| 2017/0235308 A1 | 8/2017 | Gordon et al. |
| 2017/0242113 A1 | 8/2017 | Lauenstein |
| 2017/0363739 A1 | 12/2017 | Lauenstein |
| 2017/0371039 A1 | 12/2017 | Clark et al. |
| 2018/0100922 A1 | 4/2018 | Wigh et al. |
| 2018/0107210 A1 | 4/2018 | Harnett et al. |
| 2018/0224544 A1 | 8/2018 | Ivanov |
| 2018/0275649 A1 | 9/2018 | Harnett et al. |
| 2018/0288990 A1 | 10/2018 | Laster et al. |
| 2019/0079185 A1 | 3/2019 | Steenstrup et al. |
| 2019/0113619 A1 | 4/2019 | Laster |
| 2019/0235075 A1 | 8/2019 | Thompson et al. |
| 2019/0242994 A1 | 8/2019 | Wanis et al. |
| 2019/0265354 A1 | 8/2019 | Antao et al. |
| 2019/0353744 A1 | 11/2019 | Laster et al. |
| 2020/0011965 A1 | 1/2020 | Stokes et al. |
| 2020/0011981 A1 | 1/2020 | Stokes et al. |
| 2020/0072953 A1 | 3/2020 | Wigh et al. |
| 2020/0088840 A1 | 3/2020 | Stokes et al. |
| 2020/0103512 A1 | 4/2020 | Brown et al. |
| 2020/0116843 A1 | 4/2020 | Zimmerman et al. |
| 2020/0158842 A1 | 5/2020 | Wigh et al. |
| 2020/0241133 A1 | 7/2020 | Laster |
| 2020/0256967 A1 | 8/2020 | Wigh et al. |
| 2020/0300994 A1 | 9/2020 | Matson et al. |
| 2021/0096244 A1 | 4/2021 | Wigh et al. |
| 2021/0141048 A1 | 5/2021 | Laster et al. |
| 2021/0165068 A1 * | 6/2021 | Clark ................. G01S 7/521 |
| 2021/0173061 A1 | 6/2021 | Fyler et al. |
| 2021/0263150 A1 | 8/2021 | Stokes |
| 2021/0364636 A1 | 11/2021 | Simonton |
| 2021/0389439 A1 | 12/2021 | Sumi et al. |
| 2022/0035026 A1 | 2/2022 | Proctor |
| 2022/0035027 A1 | 2/2022 | Proctor |
| 2022/0113393 A1 | 4/2022 | Nishimori et al. |
| 2022/0120882 A1 | 4/2022 | Coleman et al. |
| 2022/0229178 A1 | 7/2022 | Proctor et al. |
| 2022/0373662 A1 | 11/2022 | Crawford et al. |
| 2022/0373663 A1 | 11/2022 | Caspall |
| 2022/0373678 A1 | 11/2022 | Combs et al. |
| 2022/0390542 A1 | 12/2022 | Clark et al. |
| 2022/0404491 A1 | 12/2022 | Caspall et al. |
| 2023/0111196 A1 | 4/2023 | Proctor et al. |

FOREIGN PATENT DOCUMENTS

| | | |
|---|---|---|
| AU | 2019213353 A1 | 8/2019 |
| AU | 2019203322 A1 | 12/2019 |
| AU | 2019203322 B2 | 12/2020 |
| AU | 2019283811 B2 | 9/2021 |
| CA | 2530290 C | 11/2015 |
| CA | 2899119 A1 | 1/2017 |
| CA | 2928461 A1 | 1/2017 |

(56) References Cited

FOREIGN PATENT DOCUMENTS

| | | | |
|---|---|---|---|
| CA | 2993361 A1 | 2/2017 | |
| CA | 3032163 A1 | 8/2019 | |
| CA | 3042656 A1 | 11/2019 | |
| CN | 105759257 A | 7/2016 | |
| CN | 109959914 A * | 7/2019 | |
| CN | 110493698 A | 11/2019 | |
| CN | 113740861 A * | 12/2021 | |
| EP | 1925949 A1 | 5/2008 | |
| EP | 2294452 B1 | 12/2011 | |
| EP | 2612165 A1 | 7/2013 | |
| EP | 3084467 A2 | 10/2016 | |
| EP | 3144700 A1 | 3/2017 | |
| EP | 1656568 B1 | 12/2017 | |
| EP | 3325997 A1 | 5/2018 | |
| EP | 3479138 A1 | 5/2019 | |
| EP | 3572837 A1 | 11/2019 | |
| EP | 2326970 B1 | 10/2020 | |
| EP | 2956796 B1 | 4/2022 | |
| EP | 4009069 A1 | 6/2022 | |
| JP | 2004-080577 A | 3/2004 | |
| JP | 2004347319 A * | 12/2004 | G01S 15/87 |
| JP | 2007-535195 A | 11/2007 | |
| JP | 2008-508539 A | 3/2008 | |
| JP | 2010-261883 A | 11/2010 | |
| JP | 5600678 B2 | 10/2014 | |
| JP | 5688197 B2 | 3/2015 | |
| JP | 2016-510106 A | 4/2016 | |
| JP | 2017-227489 A | 12/2017 | |
| JP | 6444319 B2 | 12/2018 | |
| JP | 2019-030623 A | 2/2019 | |
| JP | 2020-039841 A | 3/2020 | |
| JP | 6732274 B1 | 7/2020 | |
| JP | 6737464 B2 | 8/2020 | |
| JP | 2020-141250 A | 9/2020 | |
| JP | 2020-155900 A | 9/2020 | |
| JP | 2020153825 A * | 9/2020 | |
| KR | 200184719 Y1 | 6/2000 | |
| KR | 20160121915 A | 10/2016 | |
| RU | 133285 U1 | 10/2013 | |
| WO | 94/09605 A1 | 4/1994 | |
| WO | 1997/004334 A1 | 2/1997 | |
| WO | 2005/008272 A2 | 1/2005 | |
| WO | 2006/017511 A2 | 2/2006 | |
| WO | 2012/028896 A1 | 3/2012 | |
| WO | 2013/126761 A1 | 8/2013 | |
| WO | 2014/126847 A2 | 8/2014 | |
| WO | 2014/144471 A1 | 9/2014 | |
| WO | 2016/205938 A1 | 12/2016 | |
| WO | 2017/015741 A1 | 2/2017 | |
| WO | 2018/201097 A2 | 11/2018 | |
| WO | 2018/222556 A1 | 12/2018 | |
| WO | 2019/050552 A1 | 3/2019 | |
| WO | 2020/114107 A1 | 6/2020 | |
| WO | 2020/174640 A1 | 9/2020 | |
| WO | 2021/019858 A1 | 2/2021 | |
| WO | 2021/127592 A2 | 6/2021 | |
| WO | 2021/176726 A1 | 9/2021 | |
| WO | 2021/220377 A1 | 11/2021 | |

OTHER PUBLICATIONS

CN-113740861-A (machine translation) (Year: 2021).*
JP-2004347319-A (machine translation) (Year: 2004).*
JP-2020153825-A (machine translation) (Year: 2020).*
"Active Target 'Scout Only' Transducer Mount Combo;" RyTek Marine; retreived Aug. 10, 2022 from https://rytekmarine.com/collections/lowrance-activetarget/products/active-target-scout-only-transducer-mount-combo.
"Garmin Marine Webinars: Panoptix LiveScope Installation and Setup;" YouTube; Apr. 6, 2020; retreived Jan. 12, 2021 from https://www.youtube.com/watch?v=Z2AiSOmX5PA.
"LED Programmable Message Pocket Fan & Rave Toy"; retrieved Jan. 31, 2019 from https://www.amazon.com/LED-Programmable-Message-Pocket-Rave/dp/B002FWOYG2.
Rathod; "A Review of Acoustic Impedance Matching Techniques for Piezoelectric Sensors and Transducers;" Sensors; vol. 20; No. 14; Jul. 21, 2020; DOI: https://doi.org/10.3390/s20144051.
"SAMM"; Oceanic Imaging Consultants; retrieved Feb. 12, 2021 from https://www.geomatrix.co.uk/software/oceanographic-and-hydrographic/samm/.
"Teledyne SeaBotix—SmartFlight 2.0"; YouTube; Apr. 13, 2018; retrieved Feb. 17, 2021 from https://www.youtube.com/watch?v=xFJ2OCKIXwc.
ADS, Inc.; "SeaBotix—Underwater Remotely Operated Vehicles (ROVs)"; YouTube, Jul. 16, 2014; retrieved from https://www.youtube.com/watch?v=hkqJh5j6eQA.
AeroKontiki—Introducing the world's first autopilot fishing drone kontiki website visited Oct. 25, 2016 (4 pgs.) http://www.aerokontiki.com/.
AguaDrone—The World's First Drone with a Fish Finder! website visited Oct. 25, 2016 (10 pgs.) https://www.aguadrone.com/.
DIY Drones—The Leading Community for Personal UAVs-Home website visited Oct. 25, 2016 (9 pgs.) www.diydrones.com.
DIY Drones—The Leading Community for Personal UAVs—My Blog Automated Precision Landing on a (stationary) Boat website visited Oct. 25, 2016 (6 pgs.) www.diydrones.com/profiles/blogs/automated-precision-landing-on-a-stationary-boat.
Ellison, Ben; Panbo; The Marine Electronics Hub; "Garmin BlueChart g2 & g2 Vision 2010, lots new?" Mar. 16, 2010; retrieved from <https://www.panbo.com/garmin-bluechart-g2-g2-vision-2010-lots-new>.
Ellison, Ben; Panbo; The Marine Electronics Hub; "Maptech i3 fishfinder road trip" Jun. 15, 2005; retrieved from <https://www.panbo.com/maptech-i3-fishfinder-road-trip>.
European Examination Report issued in Application No. 19174327.7 dated Mar. 7, 2023.
Jul. 16, 2014 Video (mentioning SmartFlight); retreived Jul. 29, 2020 from https://www.youtube.com/watch?v=hkqJh5j6eQA.
Nov. 26, 2021 Extended European Search Report issued in European Patent Application No. 21177698.4; 8 pp.
RyTek Marine (Apr. 6, 2022). Seeing double isn't always a bad thing . . . ; retreived Sep. 30, 2022 from https://www.facebook.com/RyTekMarine.
SeaBotix—Underwater Remotely Operated Vehicles (ROVs); ADS, Inc. YouTube. 2014 Video (mentioning SmartFlight): retreived Jul. 29, 2020 from https://www.youtube.com/watch?v=hkqJh5j6eQA.
SmartFlight 2.0 video; retreived Jul. 29, 2020 from: http://www.teledynemarine.com/smartflight2-0?ProductLineID=112.
Teledyne Marine; "SmartFlight 2.0 powered by Greensea"; retrieved Jun. 19, 2019 from http://www.teledynemarine.com/smartflight2-0?ProductLineID=112.
Thompson et al; "Two Dimensional and Three Dimensional Imaging Results Using Blazed Arrays;" MTS/IEEE Oceans 2001. An Ocean Odyssey. Conference Proceedings (IEEE Cat. No. 01CH37295); Nov. 5-8, 2001; pp. 985-987.
Unmanned Marine Systems USV Website visited Oct. 26, 2016 (12 pgs.) http://www.unmannedsystemstechnology.com/company/autonomous-surface-vehicles-ltd/.
Visual Aerials—Flying Off a Boat—Mark and Romeo's Aerial Adventures website visited Oct. 25, 2016 (3 pgs.) http://www.visual-aerials.com/flying-off-a-boat.html.
WASSP Multibeam; retrieved from <https://wassp.com/video/26/WASSP-S3-Demo-WEB.mp4> May 17, 2018.
Extended European Search Report issued in Application No. 24172655.3 dated Oct. 21, 2024.

* cited by examiner

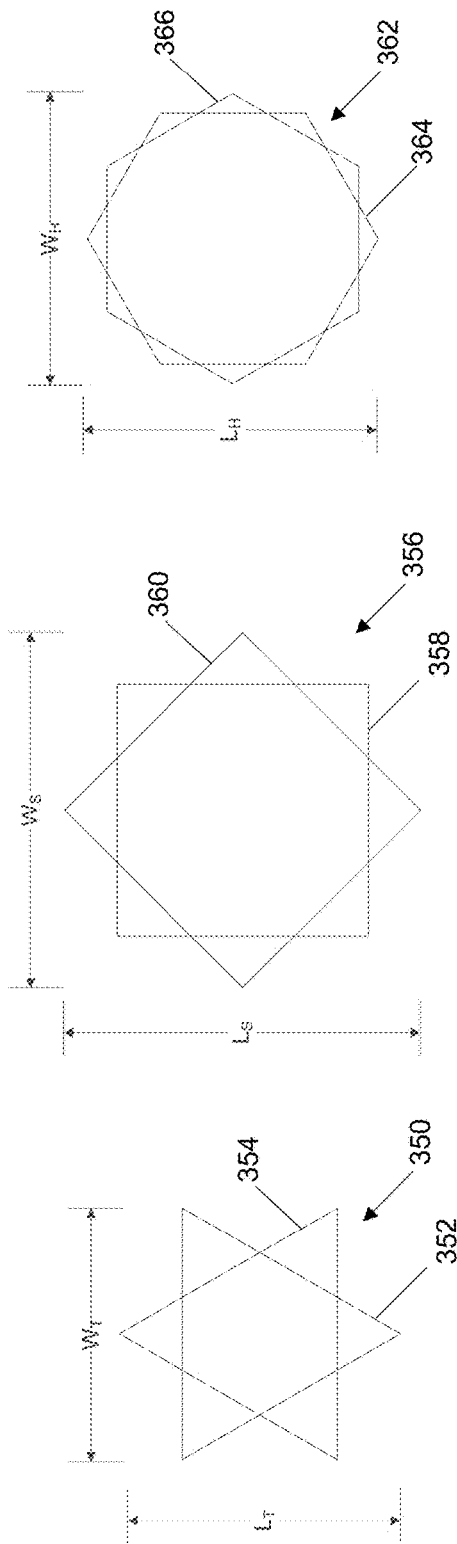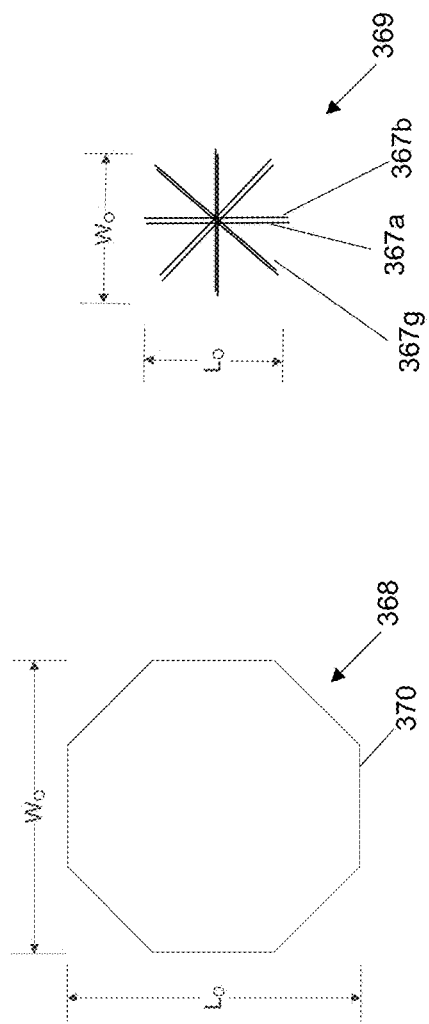

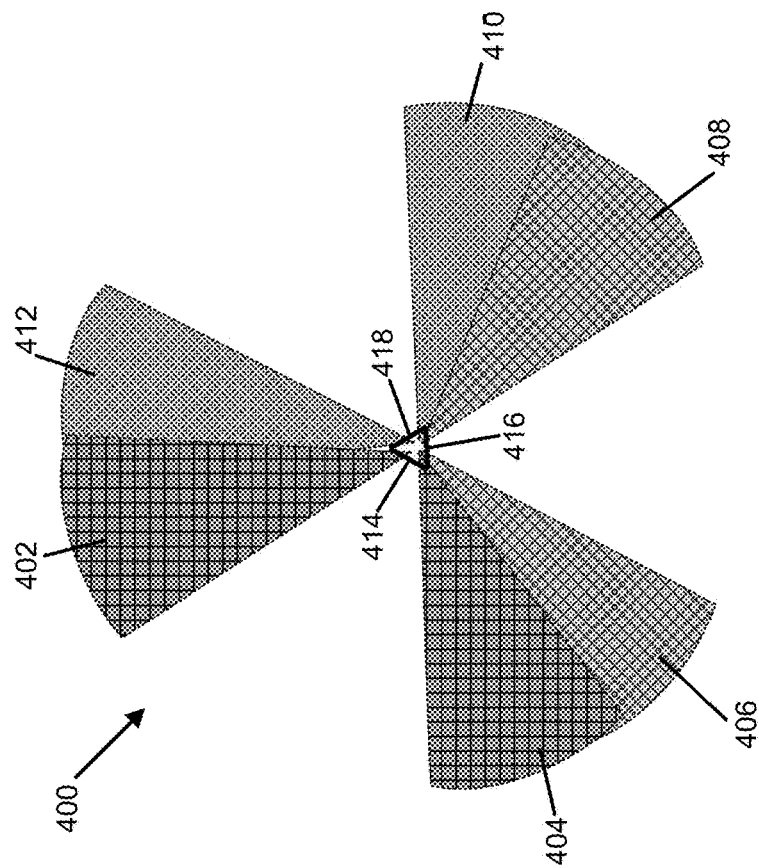
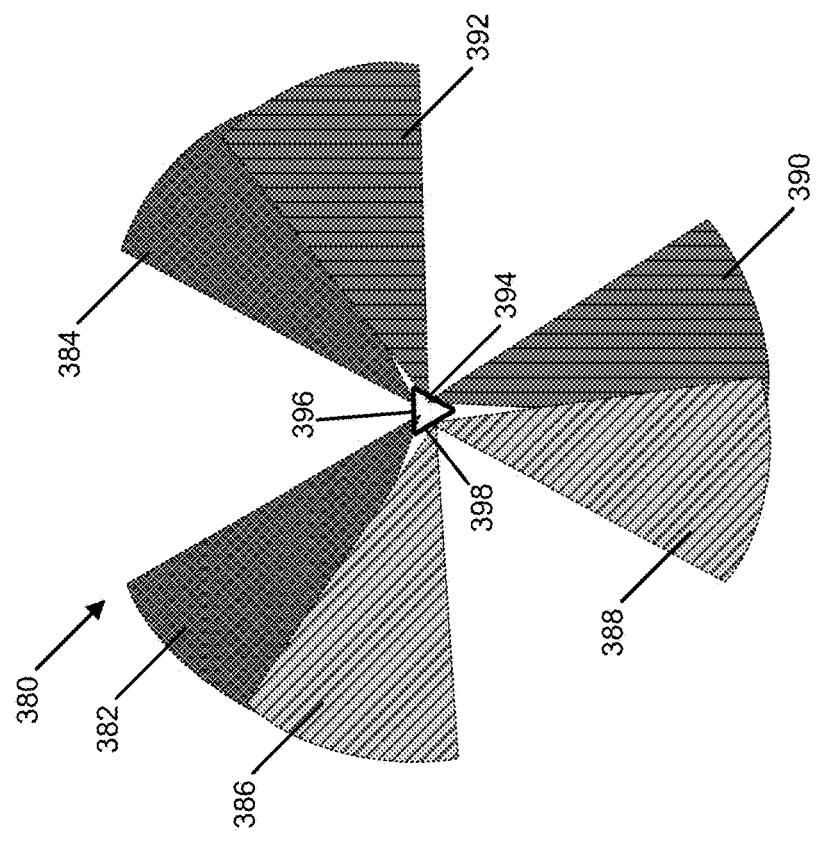
FIG. 7B
FIG. 7A

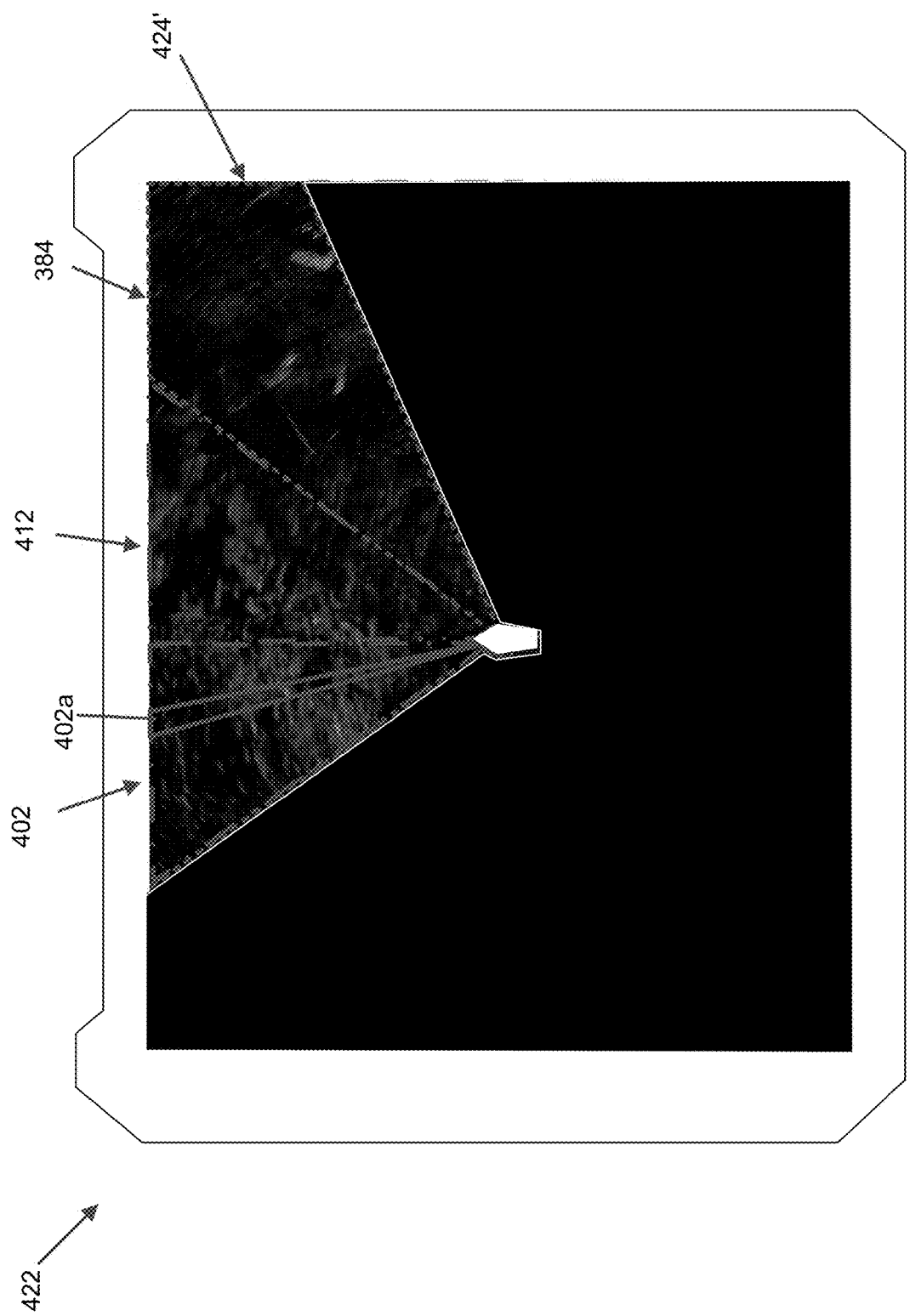

BEAMFORMING SONAR SYSTEMS FOR 360-DEGREE LIVE SONAR, AND ASSOCIATED METHODS

FIELD

Example embodiments herein generally relate to sonar systems and, more particularly to, beamforming sonar systems that provide "live" sonar imagery.

BACKGROUND

Sonar (SOund Navigation And Ranging) has been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater and provide an understanding of the underwater environment. Sonar transducer elements convert electrical energy into sound or vibrations. Sonar signals are transmitted into and through the water and reflected from encountered objects (e.g., fish, bottom surface, underwater structure, etc.). The transducer elements receive the reflected sound as sonar returns and convert the sound energy into electrical energy (e.g., sonar return data). Based on the known speed of sound, it is possible to determine the distance to and/or location of the waterborne or underwater objects. The sonar return data can also be processed to be displayed on a display device, giving the user a "picture" (or image) of the underwater environment.

Different types of sonar systems provide different sonar functionality, many with differing benefits. As such, there is need for sonar systems with improved sonar image functionality while still providing a reasonable cost to the user (e.g., an angler).

BRIEF SUMMARY

Example embodiments provide various sonar systems for imaging an underwater environment. Some example sonar systems include multiple arrays of transducer elements. The array(s) are operated to transmit sonar signals into the underwater environment. The array(s) are also operated at a fixed phase shift but vary in frequency so as to beamform multiple sonar return beams. The multiple sonar return beams can be filtered based on frequency between a first range of angles and between a second range of angles. A gap is formed between the first range of angles and the second range of angles. One or more array(s) can be oriented such that ranges of angles cover, for example, a volume of water beneath the watercraft that ranges a full 360 degrees. Further, with the ability to beamform multiple sonar return beams (e.g., sonar beams with widths of 0.25°-2° each) by varying frequency-precise sonar return data specific to a small slice of the underwater environment can be used, and simultaneous display of multiples of the slices can provide a 360-degree near-real time (or "live") sonar image.

In some embodiments, at least six sonar transducer arrays may be positioned within a housing such that the 360-degree coverage of the underwater environment is achieved. In some embodiments, the at least six sonar transducer arrays may be positioned within a same plane that is, e.g., parallel to a surface of water. In some other embodiments, the at least six sonar transducer arrays may be positioned in a stacked arrangement, such as within two different planes that are both, e.g., parallel to the surface of water. For example, three sonar transducer arrays may be positioned in a first plane in a triangular configuration, and three more sonar transducer arrays may be positioned in a second plane in a triangular configuration. The first plane of sonar transducer arrays and the second plane of sonar transducer arrays may be oriented such that they are stacked on top of each other and such that the triangular shape of the first plane and the triangular shape of the second plane overlap such that the points of the triangular shapes do not intersect. In other embodiments, the sonar transducer arrays may be placed within more or less than two planes, and the sonar transducer arrays within each plane may take on any other shape (e.g., other than a triangle).

Further, in some embodiments, at least six sonar transducer arrays may be positioned and aimed relative to each other so that each gap range of angles of a sonar transducer array is covered by a combination of a first range of angles of a first adjacently positioned sonar transducer array and a second range of angles of a second adjacently positioned sonar transducer array. This positioning may be achieved both when the at least six sonar transducer arrays lay in a same plane or when the at least six sonar transducer arrays lay in different planes (e.g., when the at least six sonar transducer arrays are in a stacked configuration).

In some embodiments, a system may be capable of producing 360-degree live sonar images depicting a full picture of the underwater environment beneath the watercraft. Further, in some embodiments, a system may be additionally or alternatively capable of producing partial (i.e., less than 360-degree) live sonar images. For example, some systems may be configured to use select sonar transducer arrays within the at least six sonar transducer arrays to achieve a desired partial picture of the underwater environment beneath the watercraft. In some further embodiments, a system may also be capable of identifying an object within the partial live sonar image and adjusting the sonar transducer arrays being used to create the partial live sonar image such that the object remains within the partial live sonar image.

Additionally, each of the at least six sonar transducer arrays may have a tilt angle with respect to a horizontal plane that is parallel to a surface of water. In some embodiments, all of the at least six sonar transducer arrays may have the same tilt angle, and the tilt angle may be adjustable. For example, a system may include a mechanism for tilting the at least six sonar transducer arrays and for adjusting the corresponding frequencies accordingly such that capability of 360-degree coverage is maintained by the at least six sonar transducer arrays as a whole. Such mechanism may be, e.g., a cam mechanism, a cable mechanism, an umbrella mechanism, or any other mechanism that is operable to tilt the at least six sonar transducer arrays.

In an example embodiment, a sonar transducer assembly that is mountable to a watercraft is provided. The sonar transducer assembly includes a housing and at least six sonar transducer arrays positioned within the housing in a circumferential pattern around a center point such that the at least six sonar transducer arrays are aimed outwardly and downwardly from the center point. Each of the at least six sonar transducer arrays includes a plurality of transducer elements, and the plurality of transducer elements are configured to operate at a fixed phase shift and vary in frequency so as to beamform multiple sonar return beams for receiving sonar return data from a portion of an underwater environment. Each of the at least six sonar transducer arrays are configured to beamform sonar return beams through a first range of angles and a second range of angles, and the first range of angles is separated from the second range of angles by a gap range of angles. The at least six sonar transducer arrays are positioned and aimed relative to each other so that each gap range of angles of a sonar transducer array is covered by a first range of angles or a second range of angles of at least one adjacently positioned sonar transducer array such that beamformed multiple sonar return beams from the at least six sonar transducer arrays collectively provide simultaneous sonar return data corresponding to 360-degree coverage of the underwater environment relative to the watercraft.

In some embodiments, the at least six sonar transducer arrays may be positioned and aimed relative to each other so that each gap range of angles of a sonar transducer array is covered by a combination of a first range of angles of a first adjacently positioned sonar transducer array and a second range of angles of a second adjacently positioned sonar transducer array.

In some embodiments, a first sonar transducer array of the at least six sonar transducer arrays may be configured to beamform first sonar return beams through a first range of angles of the first sonar transducer array and a second range of angles of the first sonar transducer array, and the first range of angles of the first sonar transducer array may be separated from the second range of angles of the first sonar transducer array by a first gap range of angles. A second sonar transducer array of the at least six sonar transducer arrays may be configured to beamform second sonar return beams through a third range of angles of the second sonar transducer array and a fourth range of angles of the second sonar transducer array, and the third range of angles of the second sonar transducer array may be separated from the fourth range of angles of the second sonar transducer array by a second gap range of angles. The third range of angles of the second sonar transducer array may cover the first gap range of angles, and the second range of angles of the first sonar transducer array may cover the second gap range of angles.

In some embodiments, the sonar return data corresponding to the 360-degree coverage of the underwater environment may be used to form sonar image data that is configured for presentation of a sonar image.

In some embodiments, the sonar image may be generated using sonar return data from all of the at least six sonar transducer arrays.

In some embodiments, the sonar image may be generated using sonar return data from a portion of the sonar return beams, and the portion may be determined based on user input.

In some embodiments, an object may be identified within the sonar image, and, over time, the portion of sonar return beams being used to generate the sonar image may be adjusted such that the object remains within the sonar image.

In some embodiments, each of the sonar return beams may have a low frequency end and a high frequency end, and the at least six sonar transducer arrays may be configured such that the low frequency end of each of the multiple sonar return beams is adjacent to a low frequency end of a first adjacent sonar beam and such that the high frequency end of each of the multiple sonar return beams is adjacent to a high frequency end of a second adjacent sonar beam.

In some embodiments, the assembly may include eight sonar transducer arrays.

In some embodiments, the eight sonar transducer arrays may be arranged within a horizontal plane, and the horizontal plane may be parallel to a surface of water.

In some embodiments, each of the at least six sonar transducer arrays may have a tilt angle with respect to a horizontal plane that is parallel to a surface of water.

In some embodiments, the tilt angles of all of the at least six sonar transducer arrays may be the same.

In some embodiments, the housing may be configured to move the at least six sonar transducer arrays such that the tilt angle of each of the at least six sonar transducer arrays changes.

In some embodiments, the assembly may further include a processor, and the processor may be configured to adjust frequencies of the pluralities of transducer elements based on the tilt angles.

In some embodiments, the housing may include an umbrella mechanism that causes the at least six sonar transducer arrays to move such that the tilt angles change.

In some embodiments, the housing may include a cam mechanism that causes the at least six sonar transducer arrays to move such that the tilt angles change.

In some embodiments, the housing may include a cable mechanism that causes the at least six sonar transducer arrays to move such that the tilt angles change.

In some embodiments, the housing may be movable in a vertical direction with respect to the watercraft.

In another example embodiment, a system is provided for generating an image of an underwater environment. The system includes at least six sonar transducer arrays positioned in a circumferential pattern around a center point such that the at least six sonar transducer arrays are aimed outwardly and downwardly from the center point. Each of the at least six sonar transducer arrays includes a plurality of transducer elements, and the plurality of transducer elements are configured to operate at a fixed phase shift and vary in frequency so as to beamform multiple sonar return beams for receiving sonar return data from a portion of an underwater environment. Each of the at least six sonar transducer arrays are configured to beamform sonar return beams through a first range of angles and a second range of angles, and the first range of angles is separated from the second range of angles by a gap range of angles. The at least six sonar transducer arrays are positioned and aimed relative to each other so that each gap range of angles of a sonar transducer array is covered by a first range of angles or a second range of angles of at least one adjacently positioned sonar transducer array such that beamformed multiple sonar return beams from the at least six sonar transducer arrays collectively provide simultaneous sonar return data corresponding to 360-degree coverage of the underwater environment relative to the watercraft.

In another example embodiment, a method is provided for operating and creating a 360-degree live sonar image. The method includes receiving sonar return data from at least six sonar transducer arrays. The at least six sonar transducer arrays are positioned in a circumferential pattern around a center point such that the at least six sonar transducer arrays are aimed outwardly and downwardly from the center point. Each of the at least six sonar transducer arrays includes a plurality of transducer elements, and the plurality of transducer elements are configured to operate at a fixed phase shift and vary in frequency so as to beamform multiple sonar return beams for receiving sonar return data from a portion of an underwater environment. Each of the at least six sonar transducer arrays are configured to beamform sonar return beams through a first range of angles and a second range of angles, and the first range of angles is separated from the second range of angles by a gap range of angles. The at least six sonar transducer arrays are positioned and aimed relative to each other so that each gap range of angles of a sonar transducer array is covered by a first range of angles or a second range of angles of at least one adjacently positioned sonar transducer array such that beamformed multiple sonar return beams from the at least six sonar transducer arrays collectively provide simultaneous sonar return data corresponding to 360-degree coverage of the underwater environment relative to the watercraft. The method also includes generating a 360-degree sonar image based on the received sonar return data.

In another example embodiment, a sonar transducer assembly that is mountable to a watercraft is provided. The sonar transducer assembly includes a housing and at least three first sonar transducer arrays positioned within the housing in a circumferential pattern around a first center point such that the at least three first sonar transducer arrays are aimed outwardly and downwardly from the first center point. The at least three first sonar transducer arrays are positioned within a first horizontal mounting plane. The sonar transducer assembly also includes at least three second sonar transducer arrays positioned within the housing in a circumferential pattern around a second center point such that the at least three second sonar transducer arrays are aimed outwardly and downwardly from the second center point. The at least three second sonar transducer arrays are positioned within a second horizontal mounting plane. Each of the at least three first sonar transducer arrays and the at least three second sonar transducer arrays includes a plurality of transducer elements, and the plurality of transducer elements are configured to operate at a fixed phase shift and vary in frequency so as to beamform multiple sonar return beams for receiving sonar return data from a portion of an underwater environment. Each of the at least three first sonar transducer arrays and the at least three second sonar transducer arrays are configured to beamform sonar return beams through a first range of angles and a second range of angles, and the first range of angles is separated from the second range of angles by a gap range of angles. The at least three first sonar transducer arrays and the at least three second sonar transducer arrays are positioned and aimed relative to each other so that each of the gap range of angles is covered by a first range of angles or a second range of angles of at least one adjacently aimed sonar transducer array of the at least three first sonar transducer arrays or the at least three second sonar transducer arrays such that beamformed multiple sonar return beams from the at least three first sonar transducer arrays and the at least three second sonar transducer arrays collectively provide simultaneous sonar return data corresponding to 360-degree coverage of the underwater environment relative to the watercraft.

In some embodiments, the at least three first sonar transducer arrays and the at least three second sonar transducer arrays may be positioned and aimed relative to each other so that each gap range of angles of a sonar transducer array is covered by a combination of a first range of angles of a first adjacently aimed sonar transducer array and a second range of angles of a second adjacently aimed sonar transducer array.

In some embodiments, a first sonar transducer array of the at least three first sonar transducer arrays may be configured to beamform first sonar return beams through a first range of angles of the first sonar transducer array and a second range of angles of the first sonar transducer array, and the first range of angles of the first sonar transducer array may be separated from the second range of angles of the first sonar transducer array by a first gap range of angles. A second sonar transducer array of the at least three first sonar transducer arrays may be configured to beamform second sonar return beams through a third range of angles of the second sonar transducer array and a fourth range of angles of the second sonar transducer array, and the third range of angles of the second sonar transducer array may be separated from the fourth range of angles of the second sonar transducer array by a second gap range of angles. A third sonar transducer array of the at least three first sonar transducer arrays may be configured to beamform third sonar return beams through a fifth range of angles of the third sonar transducer array and a sixth range of angles of the third sonar transducer array, and the fifth range of angles of the third sonar transducer array may be separated from the sixth range of angles of the third sonar transducer array by a third gap range of angles. A fourth sonar transducer array of the at least three second sonar transducer arrays may be configured to beamform fourth sonar return beams through a seventh range of angles of the fourth sonar transducer array and an eighth range of angles of the fourth sonar transducer array, and the seventh range of angles of the fourth sonar transducer array may be separated from the eighth range of angles of the fourth sonar transducer array by a fourth gap range of angles. A fifth sonar transducer array of the at least three second sonar transducer arrays may be configured to beamform fifth sonar return beams through a ninth range of angles of the fifth sonar transducer array and a tenth range of angles of the fifth sonar transducer array, and the ninth range of angles of the fifth sonar transducer array may be separated from the tenth range of angles of the fifth sonar transducer array by a fifth gap range of angles. A sixth sonar transducer array of the at least three second sonar transducer arrays may be configured to beamform sixth sonar return beams through an eleventh range of angles of the sixth sonar transducer array and a twelfth range of angles of the sixth sonar transducer array, and the eleventh range of angles of the sixth sonar transducer array may be separated from the twelfth range of angles of the sixth sonar transducer array by a sixth gap range of angles. The eighth range of angles of the fourth sonar transducer array and the ninth range of angles of the fifth sonar transducer array may cover the first gap range of angles, the tenth range of angles of the fifth sonar transducer array and the eleventh range of angles of the sixth sonar transducer array may cover the second gap range of angles, and the twelfth range of angles of the sixth sonar transducer array and the seventh range of angles of the fourth sonar transducer array may cover the third gap range of angles. The sixth range of angles of the third sonar transducer array and the first range of angles of the first sonar transducer array may cover the fourth gap range of angles, the second range of angles of the first sonar transducer array and the third range of angles of the second sonar transducer array may cover the fifth gap range of angles, and the fourth range of angles of the second sonar transducer array and the fifth range of angles of the third sonar transducer array may cover the sixth gap range of angles.

In some embodiments, the sonar return data corresponding to the 360-degree coverage of the underwater environment may be used to form sonar image data that is configured for presentation of a sonar image.

In some embodiments, the sonar image may be generated using sonar return data from all of the sonar return beams.

In some embodiments, the sonar image may be generated using sonar return data from a portion of the sonar return beams, and the portion may be determined based on user input.

In some embodiments, an object may be identified within the sonar image, and, over time, the portion of sonar return beams being used to generate the sonar image may be adjusted such that the object remains within the sonar image.

In some embodiments, each of the sonar return beams may have a low frequency end and a high frequency end, and the at least three first sonar transducer arrays and the at least three second sonar transducer arrays may be configured such that the low frequency end of each of the multiple sonar return beams is adjacent to a low frequency end of a first adjacent sonar beam and such that the high frequency end of each of the multiple sonar return beams is adjacent to a high frequency end of a second adjacent sonar beam.

In some embodiments, the at least three first sonar transducer arrays may be four first sonar transducer arrays and the at least three second sonar transducer arrays may be four second sonar transducer arrays.

In some embodiments, each of the at least three first sonar transducer arrays and the at least three second sonar transducer arrays may have a tilt angle with respect to a horizontal plane that is parallel to a surface of water.

In some embodiments, the tilt angles of the at least three first sonar transducer arrays may be the same, and the tilt angles of the at least three second sonar transducer arrays may be the same.

In some embodiments, the housing may be configured to move the at least three first sonar transducer arrays and the at least three second sonar transducer arrays such that the tilt angle of each of the at least three first sonar transducer arrays and the at least three second sonar transducer arrays changes.

In some embodiments, the assembly may further include a processor, and the processor may be configured to adjust frequencies of the pluralities of transducer elements based on the tilt angles.

In some embodiments, the housing may include an umbrella mechanism that causes the at least three first sonar transducer arrays and the at least three second sonar transducer arrays to move such that the tilt angles change.

In some embodiments, the housing may include a cam mechanism that causes the at least six sonar transducer arrays to move such that the tilt angles change.

In some embodiments, the housing may include a cable mechanism that causes the at least six sonar transducer arrays to move such that the tilt angles change.

In some embodiments, the housing may be movable in a vertical direction with respect to the watercraft.

In some embodiments, the first horizontal mounting plane and the second horizontal mounting plane may be parallel, and the first horizontal mounting plane and the second horizontal mounting plane may be separated by at least two inches.

In another example embodiment, a system is provided for generating an image of an underwater environment. The system includes at least three first sonar transducer arrays positioned in a circumferential pattern around a first center point such that the at least three first sonar transducer arrays are aimed outwardly and downwardly from the first center point, and the at least three first sonar transducer arrays are positioned within a first horizontal mounting plane. The system also includes at least three second sonar transducer arrays positioned in a circumferential pattern around a second center point such that the at least three second sonar transducer arrays are aimed outwardly and downwardly from the second center point, and the at least three second sonar transducer arrays are positioned within a second horizontal mounting plane. Each of the at least three first sonar transducer arrays and the at least three second sonar transducer arrays includes a plurality of transducer elements, and the plurality of transducer elements are configured to operate at a fixed phase shift and vary in frequency so as to beamform multiple sonar return beams for receiving sonar return data from a portion of an underwater environment. Each of the at least three first sonar transducer arrays and the at least three second sonar transducer arrays are configured to beamform sonar return beams through a first range of angles and a second range of angles, and the first range of angles is separated from the second range of angles by a gap range of angles. The at least three first sonar transducer arrays and the at least three second sonar transducer arrays are positioned and aimed relative to each other so that each gap range of angles of a sonar transducer array is covered by a first range of angles or a second range of angles of at least one adjacently positioned sonar transducer array such that beamformed multiple sonar return beams from the at least three first sonar transducer arrays and the at least three second sonar transducer arrays collectively provide simultaneous sonar return data corresponding to 360-degree coverage of the underwater environment relative to the watercraft.

In another example embodiment, a method is provided for operating and creating a 360-degree live sonar image. The method includes receiving sonar return data from at least three first sonar transducer arrays and at least three second sonar transducer arrays. The at least three first sonar transducer arrays are positioned in a circumferential pattern around a first center point such that the at least three first sonar transducer arrays are aimed outwardly and downwardly from the first center point, and the at least three first sonar transducer arrays are positioned within a first horizontal mounting plane. The at least three second sonar transducer arrays are positioned in a circumferential pattern around a second center point such that the at least three second sonar transducer arrays are aimed outwardly and downwardly from the second center point, and the at least three second sonar transducer arrays are positioned within a second horizontal mounting plane. Each of the at least three first sonar transducer arrays and the at least three second sonar transducer arrays includes a plurality of transducer elements, and the plurality of transducer elements are configured to operate at a fixed phase shift and vary in frequency so as to beamform multiple sonar return beams for receiving sonar return data from a portion of an underwater environment. Each of the at least three first sonar transducer arrays and the at least three second sonar transducer arrays are configured to beamform sonar return beams through a first range of angles and a second range of angles, and the first range of angles is separated from the second range of angles by a gap range of angles. The at least three first sonar transducer arrays and the at least three second sonar transducer arrays are positioned and aimed relative to each other so that each gap range of angles of a sonar transducer array is covered by a first range of angles or a second range of angles of at least one adjacently positioned sonar transducer array such that beamformed multiple sonar return beams from the at least three first sonar transducer arrays and the at least three second sonar transducer arrays collectively provide simultaneous sonar return data corresponding to 360-degree coverage of the underwater environment relative to the watercraft. The method also includes generating a 360-degree sonar image based on the received sonar return data.

BRIEF DESCRIPTION OF THE SEVERAL VIEWS OF THE DRAWING(S)

Reference will now be made to the accompanying drawings, which are not necessarily drawn to scale, and wherein:

FIG. 6A illustrates an example stacked arrangement of six arrays, in accordance with some embodiments discussed herein;

FIG. 6B illustrates an example stacked arrangement of eight arrays, in accordance with some embodiments discussed herein;

FIG. 6C illustrates an example stacked arrangement of twelve arrays, in accordance with some embodiments discussed herein;

FIG. 6D illustrates an example arrangement of eight arrays, in accordance with some embodiments discussed herein;

FIG. 6E illustrates an example arrangement of eight arrays, in accordance with some embodiments discussed herein;

FIG. 6F illustrates an example circular arrangement of one or more arrays, in accordance with some embodiments discussed herein;

FIG. 7A illustrates an example first layer of arrays along with their corresponding ranges of angles of beamformed sonar return beams, in accordance with some embodiments discussed herein;

FIG. 7B illustrates an example second layer of arrays along with their corresponding ranges of angles of beamformed sonar return beams, in accordance with some embodiments discussed herein;

FIG. 8B shows the example marine electronic device presenting a partial 360-degree live sonar image, in accordance with some embodiments discussed herein;

Figure 10A:
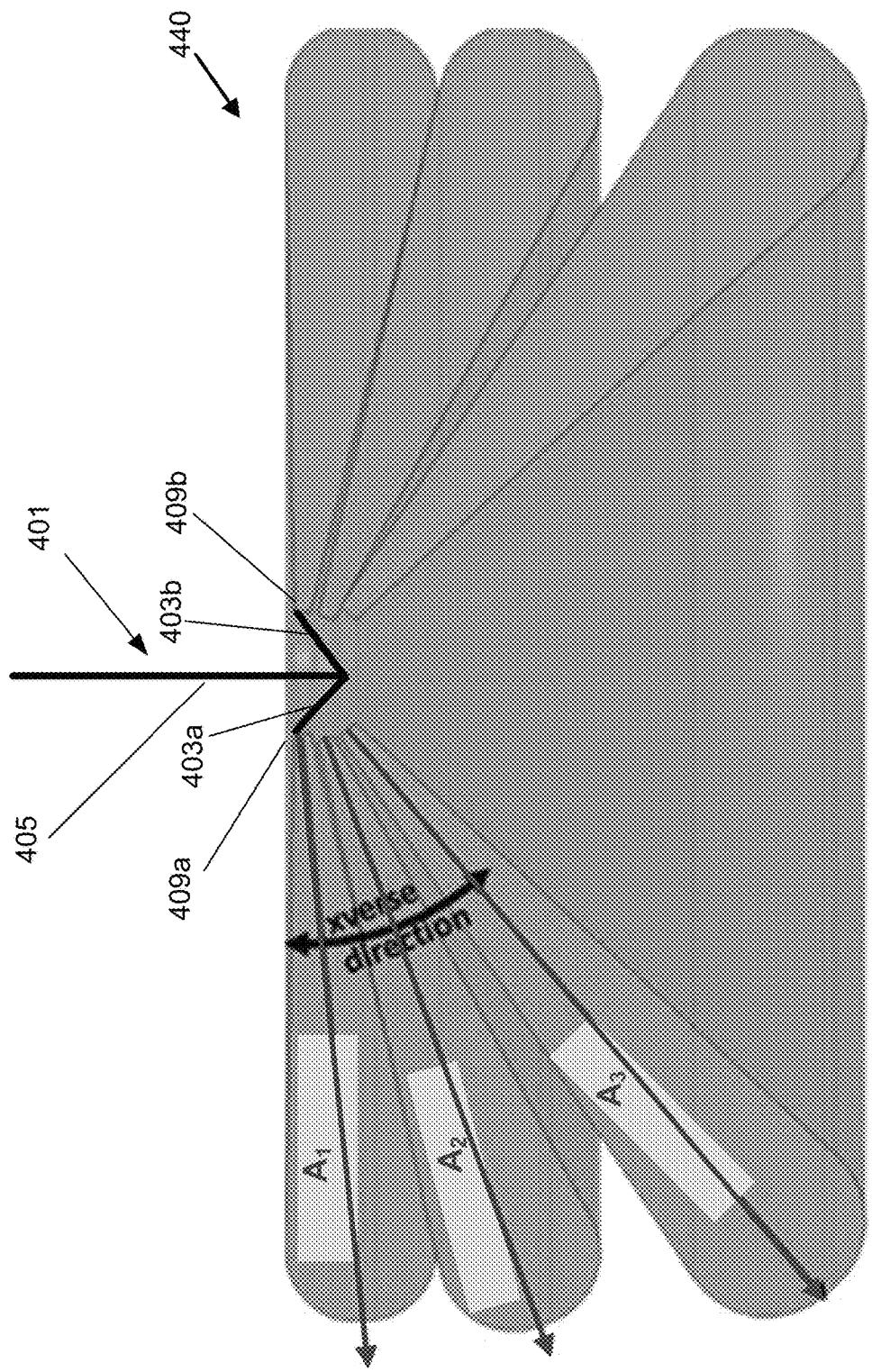
Figure 10B:
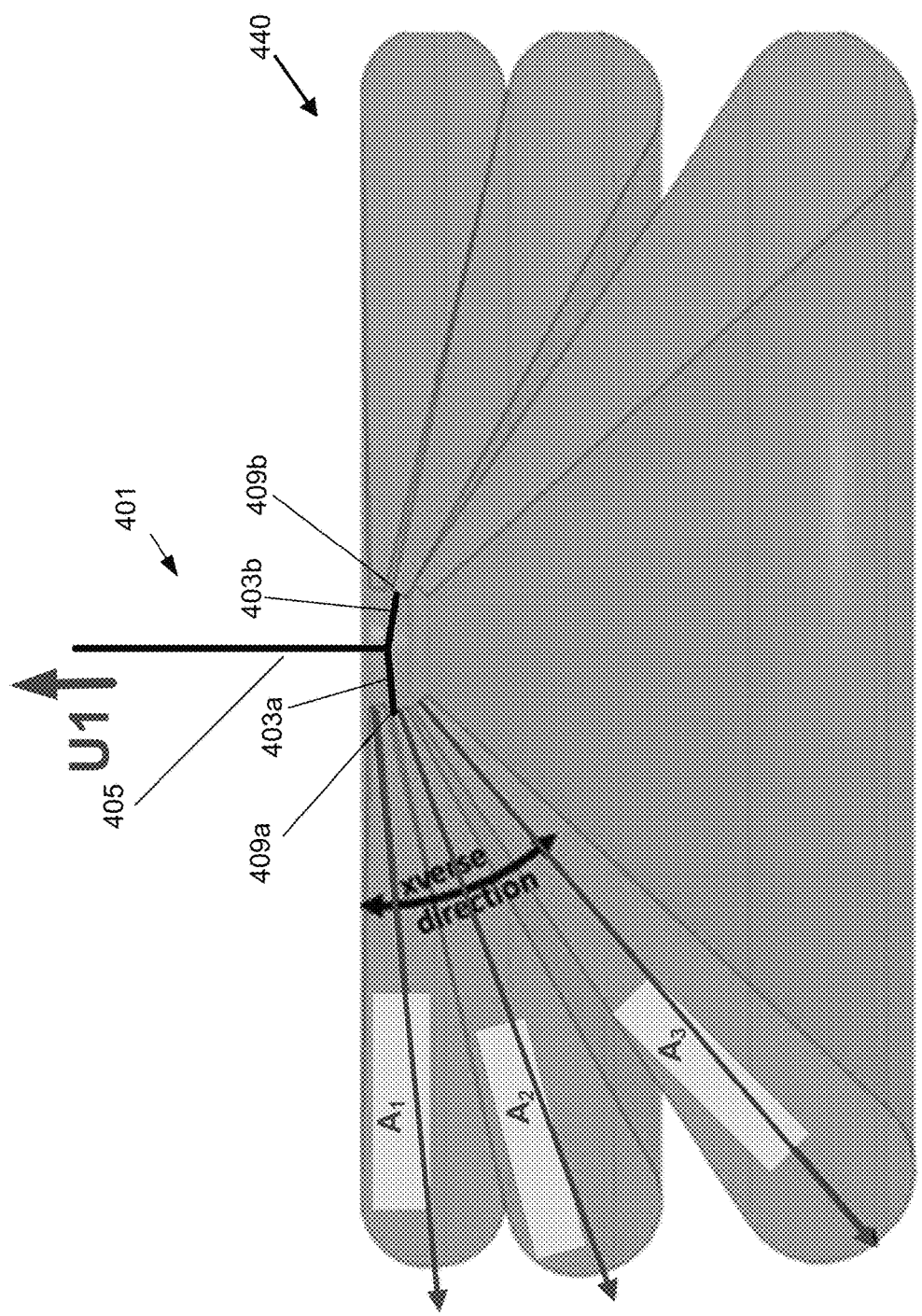
Figure 10C:
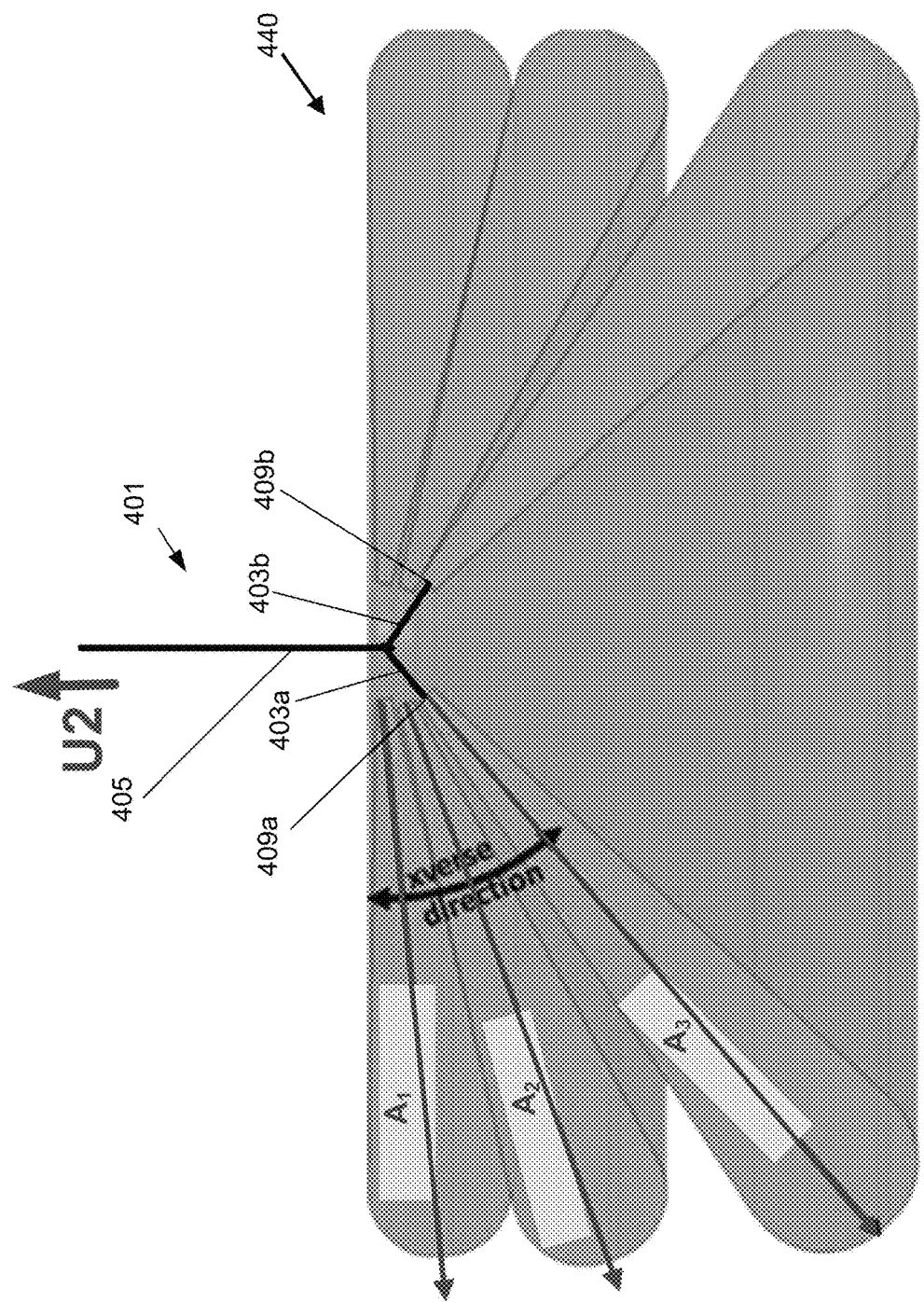
Figure 11:
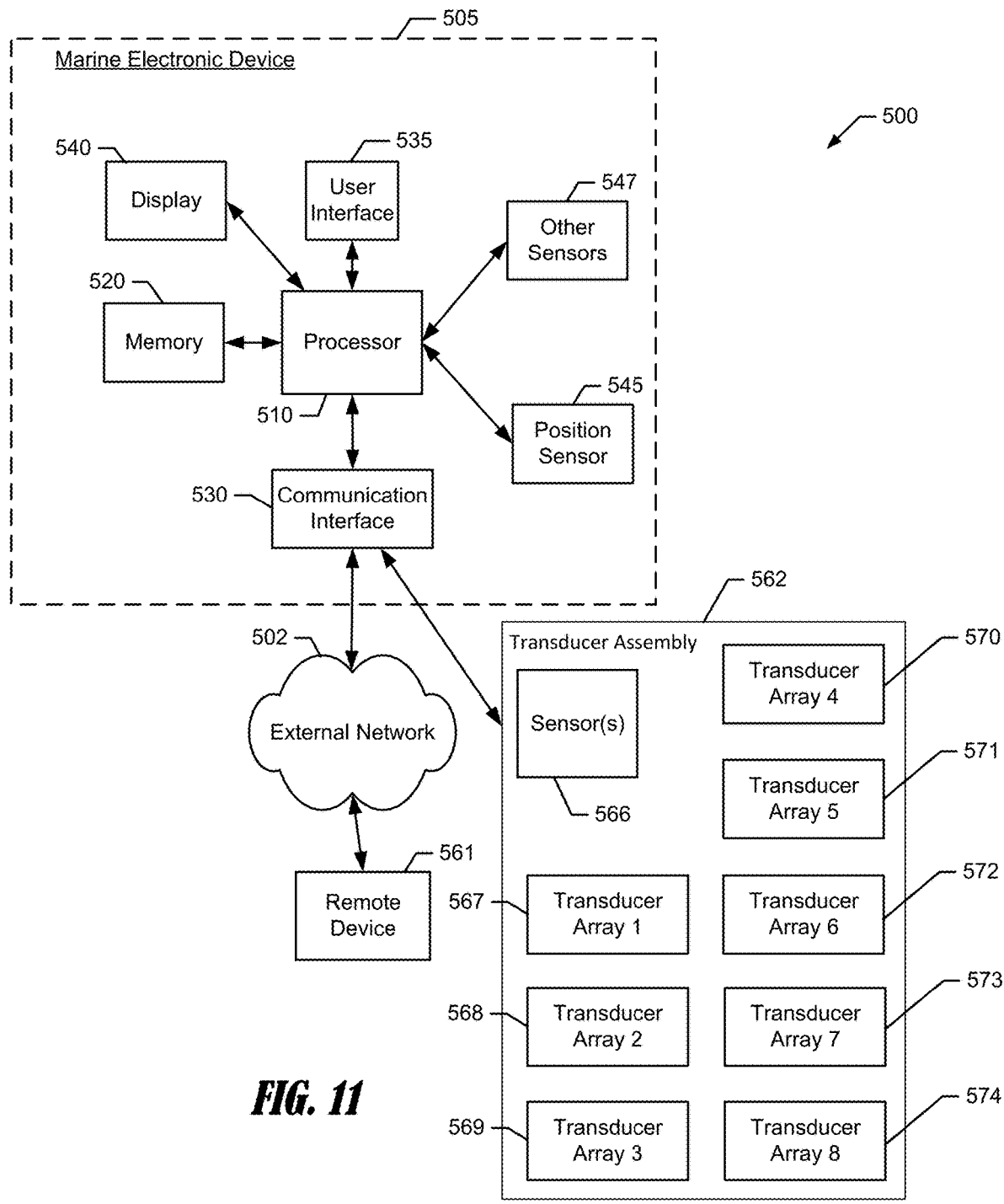
Figure 12:
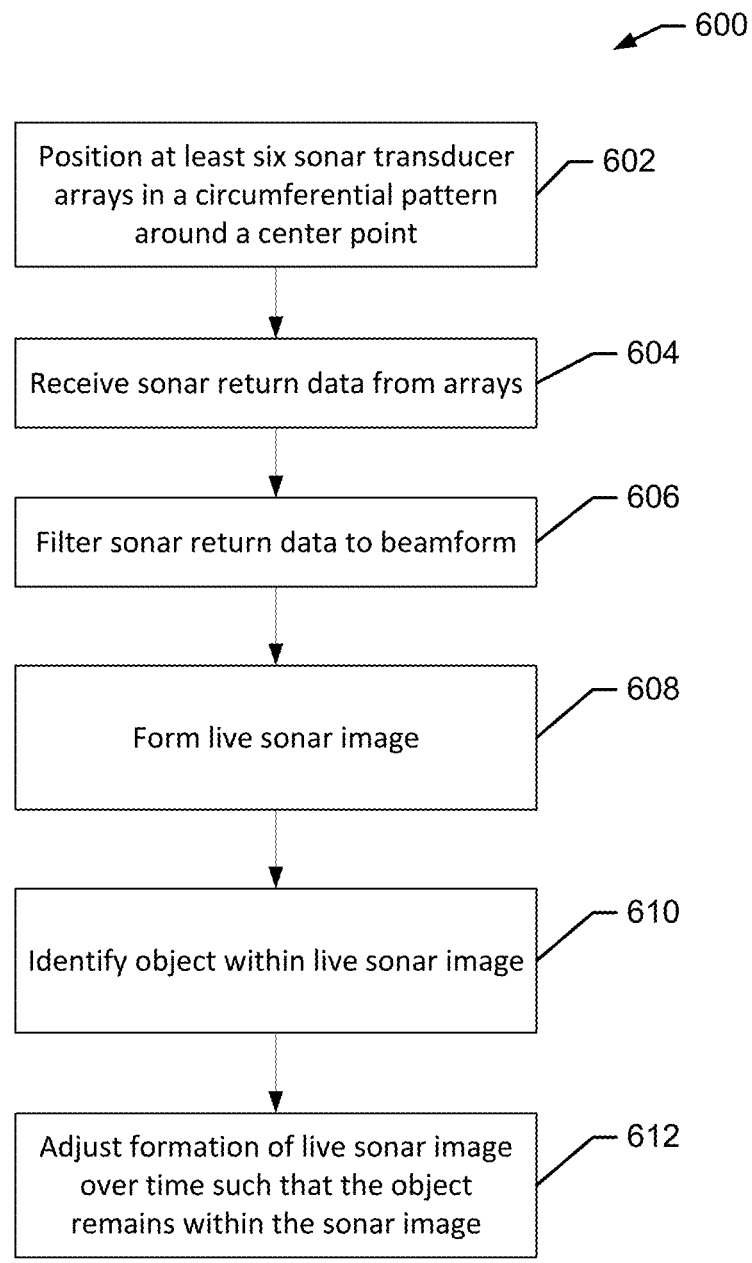

FIGS. 10A-C illustrates various example tilt angles and an example mechanism to achieve adjustable tilt angles for the transducer arrays, in accordance with some embodiments discussed herein;

FIG. 11 is a block diagram of an example sonar system, in accordance with some embodiments discussed herein; and FIG. 12 illustrates a flowchart of an example method of operating a sonar system, in accordance with some embodiments discussed herein.

DETAILED DESCRIPTION

Exemplary embodiments of the present disclosure now will be described more fully hereinafter with reference to the accompanying drawings, in which some, but not all embodiments are shown. Indeed, the present disclosure may be embodied in many different forms and should not be construed as limited to the exemplary embodiments set forth herein; rather, these embodiments are provided so that this disclosure will satisfy applicable legal requirements. Like reference numerals refer to like elements throughout.

Figure 1:
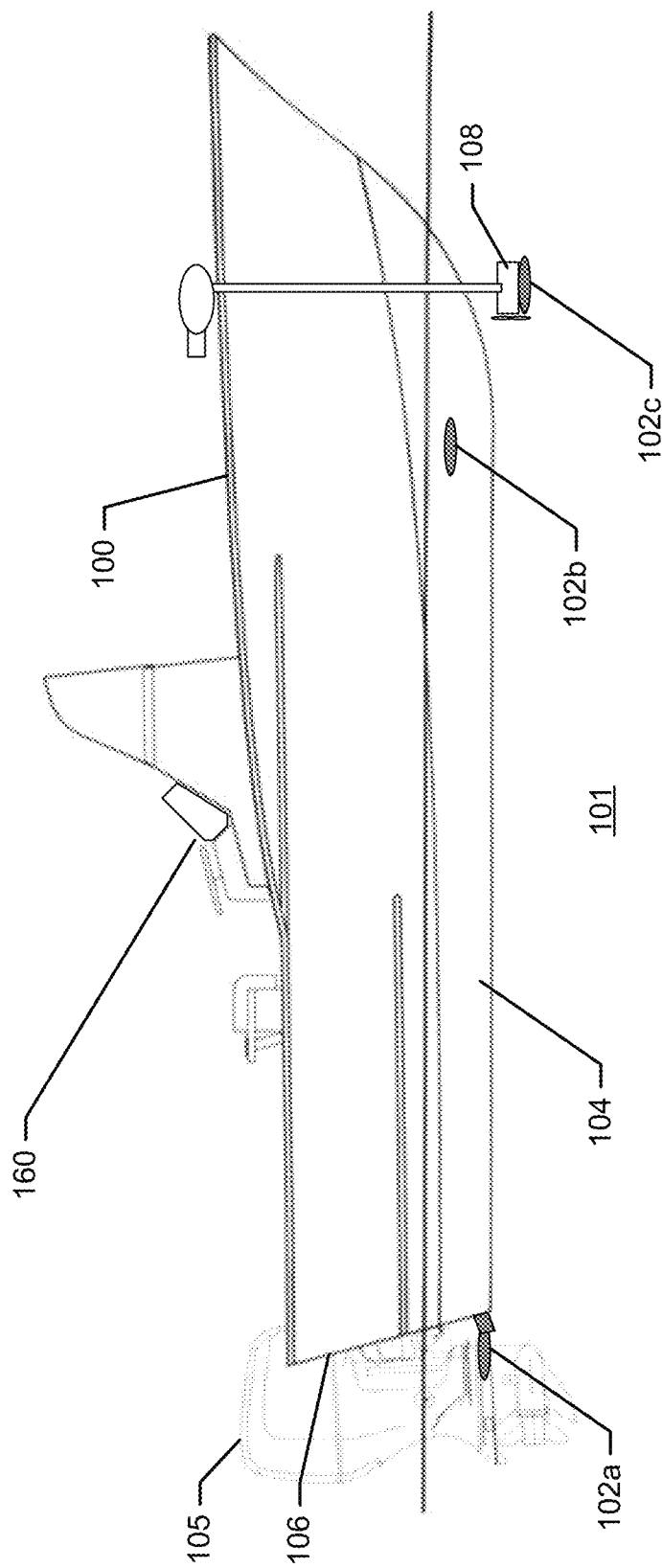
FIG. 1 illustrates an example watercraft including various sonar transducer assemblies, in accordance with some embodiments discussed herein.

As depicted in FIG. 1, a watercraft 100 (e.g., a vessel) configured to traverse a marine environment, e.g., body of water 101, may use one or more sonar transducer assemblies 102a, 102b, and 102c disposed on and/or proximate to the watercraft. The watercraft 100 may be a surface watercraft, a submersible watercraft, or any other implementation known to those skilled in the art. The transducer assemblies 102a, 102b, and 102c may each include one or more transducer elements (such as in the form of the arrays described herein) configured to transmit sound waves into a body of water, receive sonar returns from the body of water, and convert the sonar returns into sonar return data.

Depending on the configuration, the watercraft 100 may include a main propulsion motor 105, such as an outboard or inboard motor. Additionally, the watercraft 100 may include trolling motor 108 configured to propel the watercraft 100 or maintain a position. The one or more transducer assemblies (e.g., 102a, 102b, and/or 102c) may be mounted in various positions and to various portions of the watercraft 100 and/or equipment associated with the watercraft 100. For example, the transducer assembly may be mounted to the transom 106 of the watercraft 100, such as depicted by transducer assembly 102a. The transducer assembly may be mounted to the bottom or side of the hull 104 of the watercraft 100, such as depicted by transducer assembly 102b. The transducer assembly may be mounted to the trolling motor 108, such as depicted by transducer assembly 102c.

The watercraft 100 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a user's mobile device may include functionality of a marine electronic device.

Figure 2A:
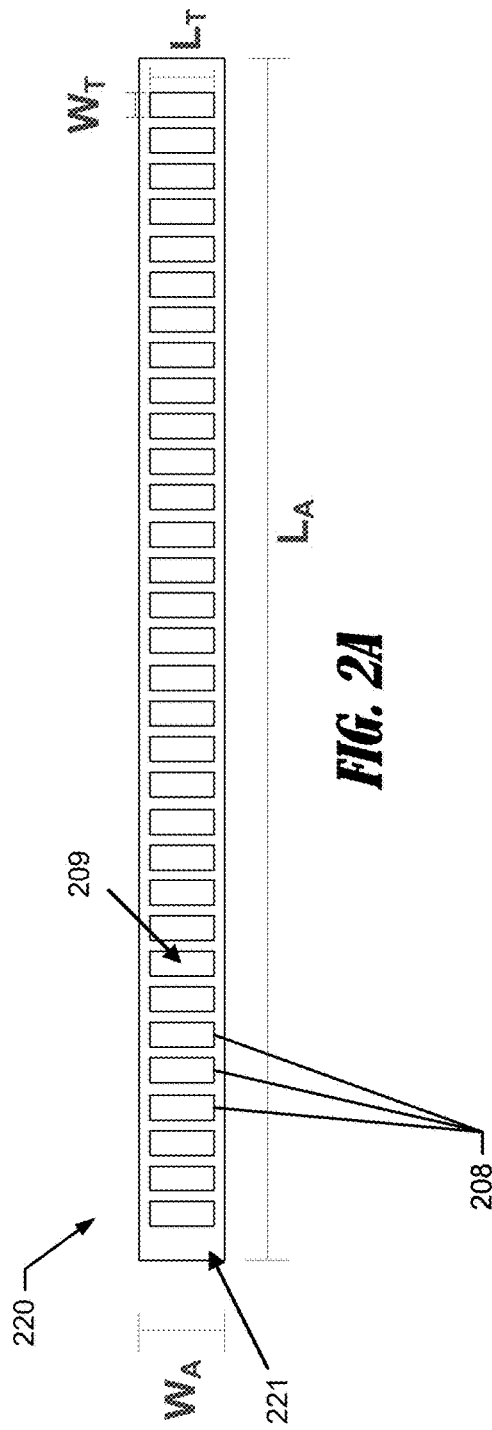
FIG. 2A illustrates an example array of transducer elements, in accordance with some embodiments discussed herein.
Figure 2B:
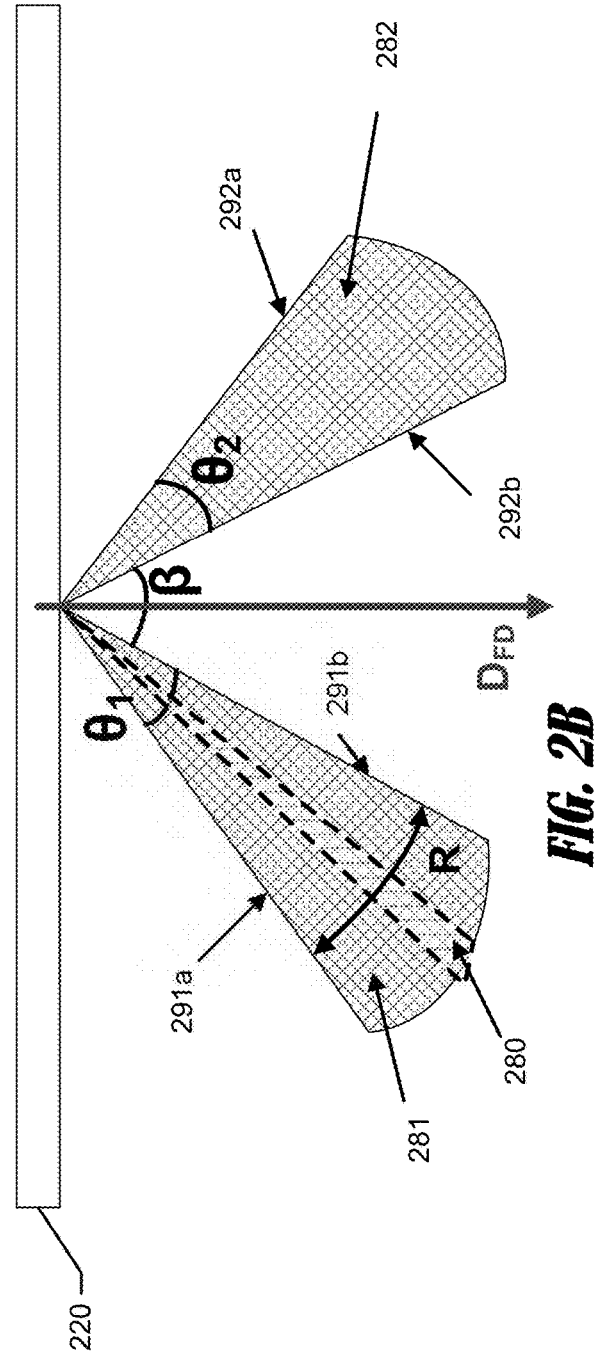
FIG. 2B illustrates a side view of the array of transducer elements shown in FIG. 2A, wherein an example first range of angles and an example second range of angles for beamformed sonar return beams are illustrated, in accordance with some embodiments discussed herein.
Figure 2C:
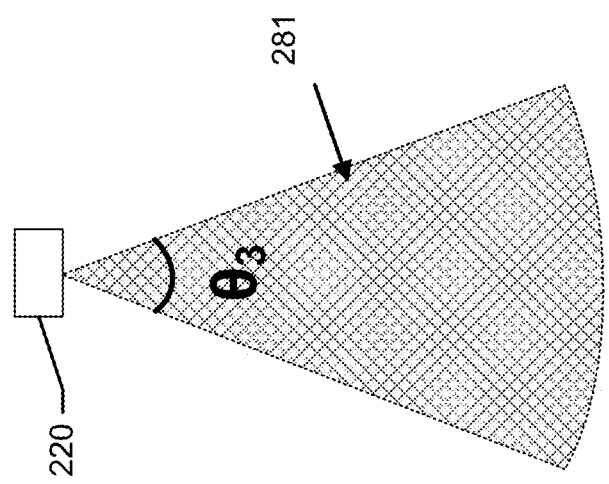
FIG. 2C illustrates an end view of the array of transducer elements shown in FIG. 2B along with illustrated ranges of angles of beamformed sonar return beams, in accordance with some embodiments discussed herein.

FIGS. 2A-C illustrate an example array 220 of transducer elements 208 that may be utilized with various embodiments of the present disclosure, such as within an example transducer assembly described herein. In some embodiments, the transducer array 220 may include a plurality of transducer elements 208 arranged in a line and electrically connected relative to each other. For example, the transducer elements 208 may be individually positioned on a printed circuit board (PCB). The PCB may mechanically support and electrically connect the electronic components, including the transducer elements using conductive tracks (e.g., traces), pads, and other features. The conductive tracks may comprise sets of traces; for example, each transducer elements may be mounted to the PCB such that the transducer element is in electrical communication with a set of traces. Each transducer element, sub-array, and/or the array of transducer elements may be configured to transmit one or more sonar pulses and/or receive one or more sonar return signals. Unless otherwise stated, although FIGS. 2A-C illustrate a linear array with transducer elements of a certain shape, different types of arrays (or sub-arrays), transducer elements, spacing, shapes, etc. may be utilized with various embodiments of the present disclosure.

In the illustrated embodiment shown in FIG. 2A, the transducer array 220 includes an emitting face 221 with a length $L_A$ and a width $W_A$, where the length is greater than the width. Within the array 220, each transducer element 208 defines an emitting face 209 with a length $L_T$ and a width $W_T$, where the length is greater than the width. The length of each transducer element 208 is perpendicular to the length of the emitting face 221. Each transducer element 208 is spaced at a predetermined distance from an adjacent transducer element, which may be designed based on desired operating characteristics of the array 220, such as described herein.

In some embodiments, the array 220 of transducer elements 208 is configured to operate to transmit one or more sonar beams into the underwater environment. Depending on the configuration and desired operation, different transmission types of sonar beams can occur. For example, in some embodiments, the array 220 may transmit sonar beams according to a frequency sweep (e.g., chirp sonar) so as to provide sonar beams into the underwater environment. In some embodiments, the array 220 may be operated to frequency steer transmitted sonar beams into various volumes of the underwater environment. In some embodiments, the array 220 may be operated to cause a broadband transmit sonar beam to be sent into the underwater environment. Depending on the frequency used and phase shift applied between transducer elements, different volumes of the underwater environment may be targeted.

In some embodiments, the array 220 may be configured to receive sonar return signals. The way the sonar return signals are received and/or processed may vary depending on the desired sonar system configuration. FIGS. 2B-2C illustrate the array 220 with example possible sonar return beam coverage according to various example embodiments. In this regard, in some embodiments, each of the plurality of transducer elements are configured to operate at a fixed phase shift (e.g., at one of 0°, π/2 radian, π/4 radian, or π/8 radian) and vary in frequency (e.g., between 500 kHz-1200 kHz). This processing approach beamforms multiple sonar return beams (e.g., beam 280) between a first range of angles ($\theta_1$) 281 and between a second range of angles ($\theta_2$) 282. To explain, the sonar returns may be received by the array 220 and filtered into frequency bins based on the frequency of the signal. From that, sonar return beams 280 can be determined that provide sonar returns within a small angle window (e.g., 0.25° to 2°, although greater or lesser angle windows are contemplated). Since the mounting orientation with respect to the watercraft can be known, and the frequency is known, then the relative angle with respect to the waterline (or other reference) can be determined and used to form sonar imagery, as described herein.

With further reference to FIG. 2B, the sonar return beams (e.g., 280) can be "steered" (e.g., along arrow R) within the first range of angles 281 based on varying the frequency (e.g., between 291a and 291b). Likewise, the sonar return beams can be "steered" within the second range of angles 282 based on varying the frequency (e.g., between 292a and 292b). By operating the transducer elements at a fixed phase shift, the two range of angles 281, 282 can be covered with sonar beams, but there is also a gap (e.g., indicated by the range of angles β) that is not able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the beam 280) that extends outwardly therefrom. By operating at a fixed phase shift and ignoring the main beam lobe, the sonar return signals received within the side lobe can be determined. Further, changing the frequency causes a shifting of the direction of the side lobe among the range of angles (281 or 282). Since the side lobe is symmetrical about the main lobe, there are two ranges of angles that are symmetrical about the facing direction $D_{FD}$ of the emitting face 221 of the array 220.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

Depending on various factors, different beam shapes can be achieved, and different ranges of angles can be achieved. The following describes some example factors that can be varied to affect the beam shapes and different ranges of angles: the number of transducer elements, the size/shape of the transducer elements, the size/shape of the array, the fixed phase shift, the frequency range, among other things. An example embodiment produces a first range of angles spanning somewhere between ~20° and ~45°, such as ~30°, and a second range of angles spanning somewhere between ~20° and ~45°, such as ~30°, with a gap of range of angles therebetween of somewhere between ~25° and ~65°, such as ~45°. Additionally, sonar return beams of ~0.25° to 2° are formed. Further, with reference to FIG. 2C, a transverse beamwidth $\theta_3$ of somewhere between ~10° and ~45°, such as ~20°, is formed. Some example embodiments that may achieve such example beam shapes include an array length of between ~100-150 mm; an array width of between ~3-10 mm; an array thickness of between ~1-3 mm; a number of transducer elements of between 50-200; a width of the transducer element of between ~0.4-1 mm; and a length of the transducer element of between ~2-10 mm (although outside of these ranges is also contemplated).

In some embodiments, the system may be configured to utilize more than one array, where the arrays are oriented relative to each other to provide a desired sonar beam coverage volume of a certain portion of the underwater environment. For example, in some embodiments, multiple array(s) can be positioned and oriented relative to each other such that the ranges of angles of each array cover (e.g., overlap with) the gap ranges of angles of other arrays to provide 360-degree coverage of the underwater environment. As described herein, various different configurations of multiple arrays may be used to achieve such 360-degree coverage. For example, in some embodiments, all of the arrays may lay in a same plane, while in other embodiments, multiple arrays may be stacked or otherwise vertically displaced such that different arrays lay in different planes.

Figure 3:
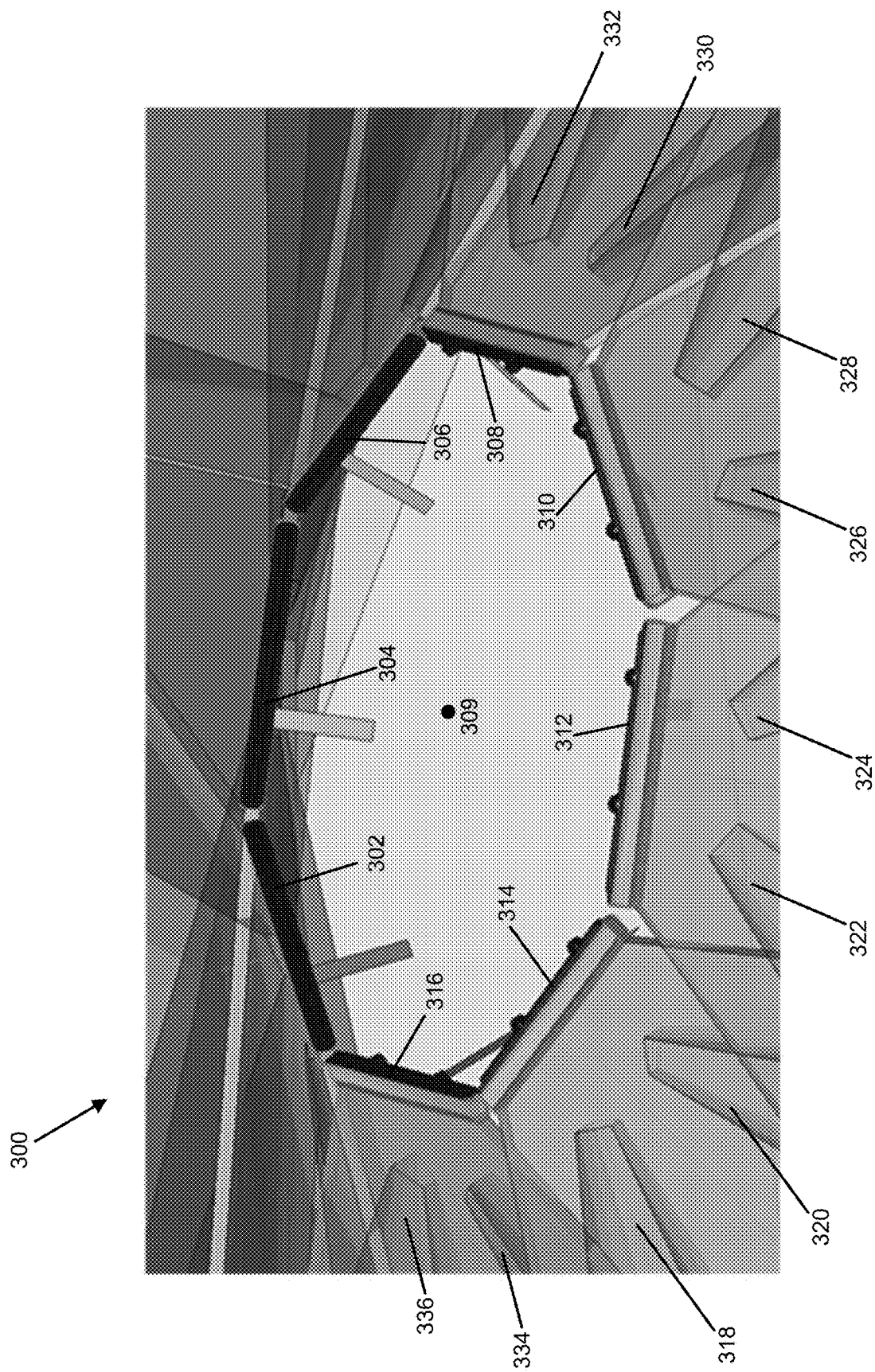
FIG. 3 illustrates a zoomed-in perspective view of an example arrangement of eight arrays to provide 360-degree sonar coverage utilizing beamformed sonar return beams, in accordance with some embodiments discussed herein.
Figure 4:
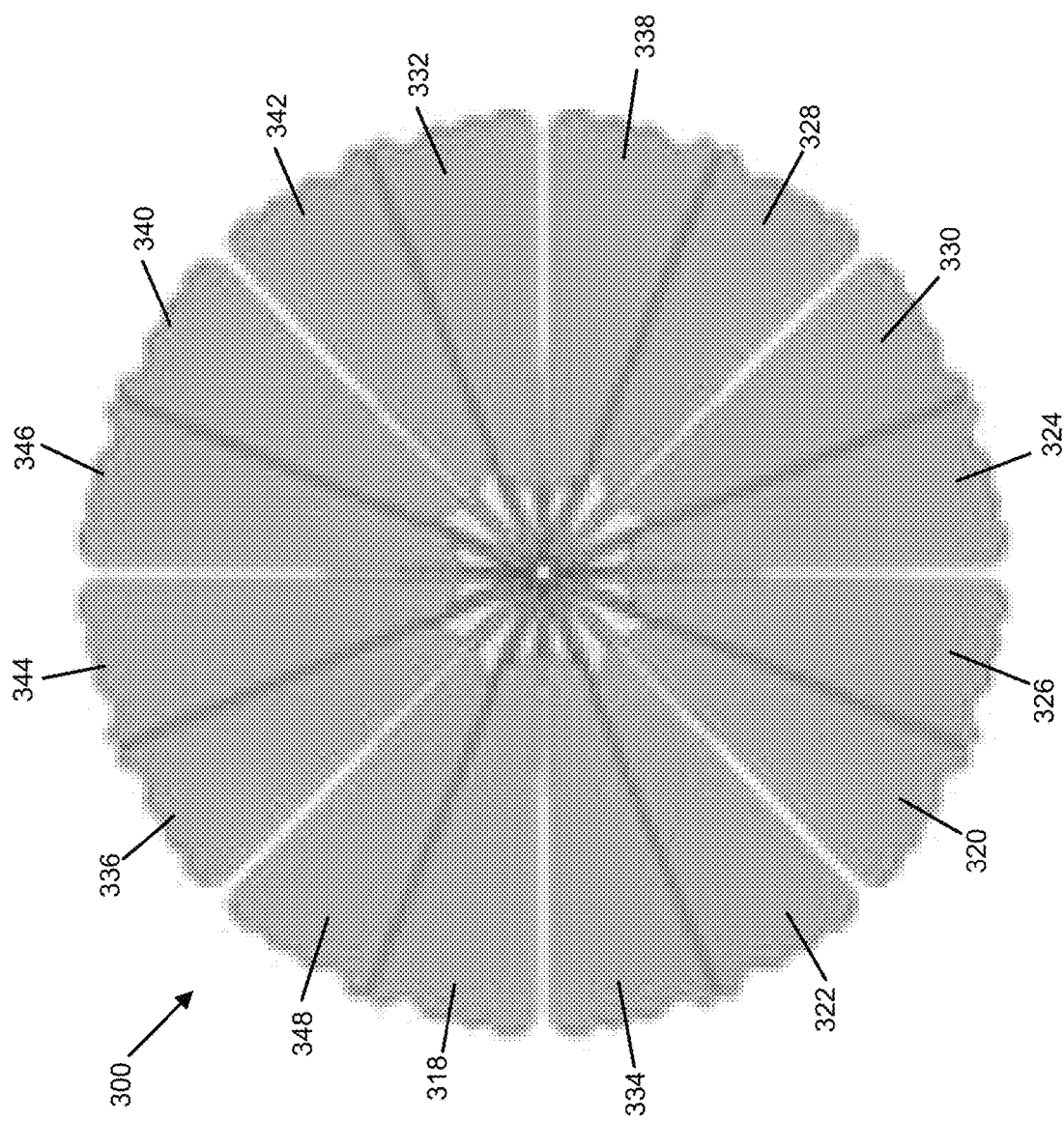
FIG. 4 illustrates a top view of example sonar beam coverage of the example arrangement of eight arrays shown in FIG. 3, in accordance with some embodiments discussed herein.
Figure 5:
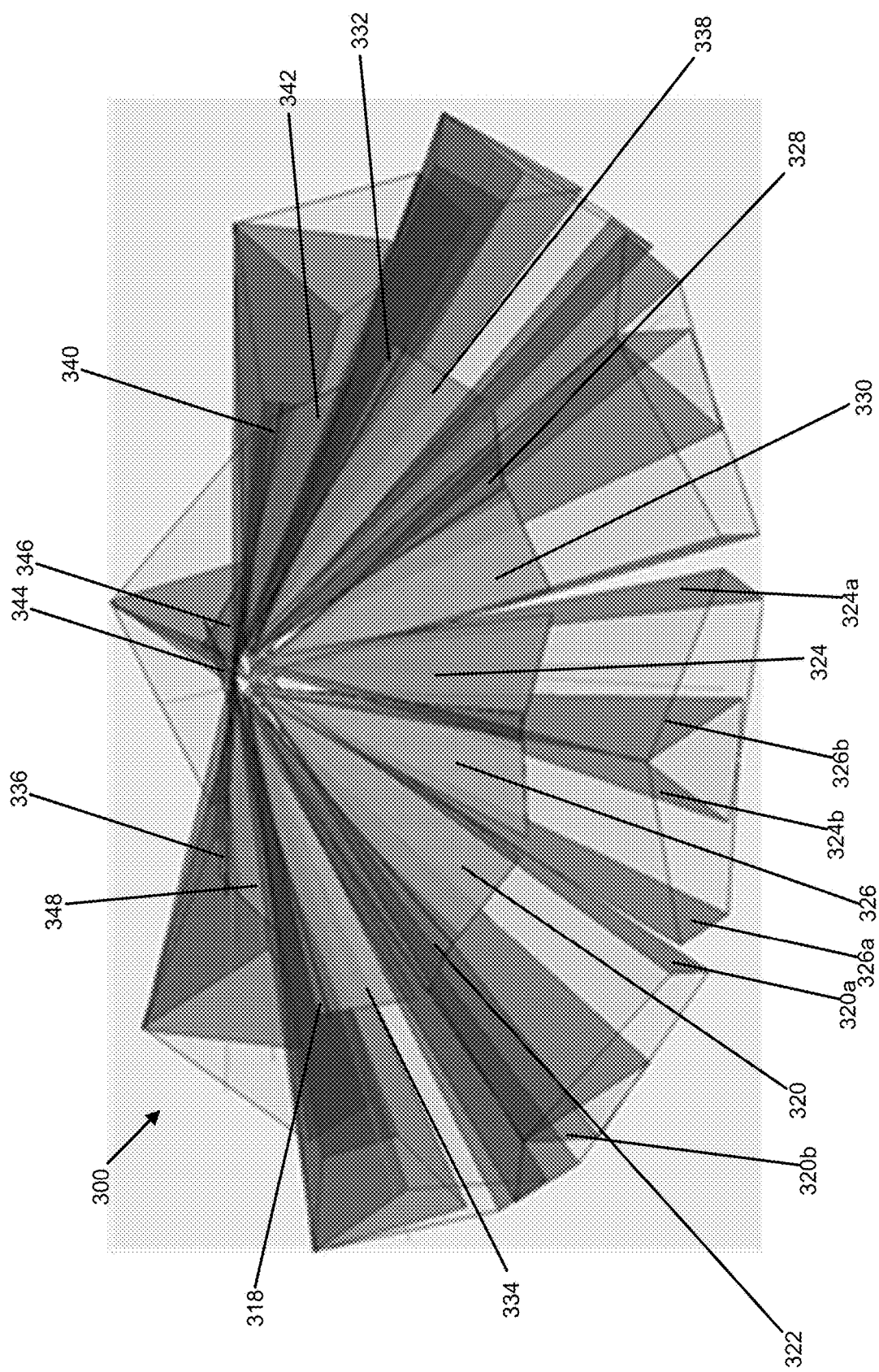
FIG. 5 illustrates a perspective view of the example sonar beam coverage of the example arrangement of eight arrays shown in FIG. 3-4, in accordance with some embodiments discussed herein.

FIGS. 3-5 illustrate an example transducer assembly 300 that is designed to provide 360-degree sonar coverage utilizing beamformed sonar return beams. As best shown in FIG. 3, the transducer assembly 300 includes a first array 302, a second array 304, a third array 306, a fourth array 308, a fifth array 310, a sixth array 312, a seventh array 314, and an eighth array 316. The arrays are positioned in a circumferential pattern around a center point 309 such that the arrays are aimed outwardly and downwardly from the center point. In some embodiments, the arrays are positioned within a housing. The first array 302 is oriented with a facing direction so as to produce a first range of angles 348 and a second range of angles 346 (with a gap in between). The second array 304 is oriented with a facing direction so as to produce a first range of angles 344 and a second range of angles 342 (with a gap in between). The third array 306 is oriented with a facing direction so as to produce a first range of angles 340 and a second range of angles 338 (with a gap in between). The fourth array 308 is oriented with a facing direction so as to produce a first range of angles 332 and a second range of angles 330 (with a gap in between). The fifth array 310 is oriented with a facing direction so as to produce a first range of angles 328 and a second range of angles 326 (with a gap in between). The sixth array 312 is oriented with a facing direction so as to produce a first range of angles 324 and a second range of angles 322 (with a gap in between). The seventh array 314 is oriented with a facing direction so as to produce a first range of angles 320 and a second range of angles 318 (with a gap in between). The eighth array 316 is oriented with a facing direction so as to produce a first range of angles 334 and a second range of angles 336 (with a gap in between).

In some embodiments, each of the sonar return beams may have a low frequency end and a high frequency end, and the arrays may be configured such that the low frequency end of each of the multiple sonar return beams is adjacent to a low frequency end of a first adjacent sonar beam and such that the high frequency end of each of the multiple sonar return beams is adjacent to a high frequency end of a second adjacent sonar beam. For example, in the embodiment shown in FIG. 5, the second range of angles 326 of the fifth array 310 has a high frequency end 326a and a low frequency end 326b. The first range of angles 324 of the sixth array 610 has a high frequency end 324a and a low frequency end 324b, and first range of angles 320 of the seventh array 314 has a high frequency end 320a and a low frequency end 320b. The low frequency ends 324b and 326b are adjacent to each other, and the high frequency ends 320a and 326a are adjacent to each other. Such a configuration allows a 360-degree sonar image that is formed using the plurality of sonar transducer arrays to be continuous, and which has improved transitions between portions of the sonar image. For example, in the event where a high frequency end may lie adjacent a low frequency end, there may be a more distinct difference in the sonar imagery corresponding to the high frequency end and the sonar imagery corresponding to the low frequency end-which leads to abrupt changes within an otherwise continuous sonar image. Instead, putting like frequencies adjacent each other leads to a smoother transition between sonar image portions.

Referring now to FIGS. 6A-6E, a transducer assembly may have multiple sonar transducer arrays, and the sonar transducer arrays may be arranged in various different configurations to achieve the 360-degree coverage. The arrays may be positioned in a circumferential pattern around a center point such that the arrays are aimed outwardly and downwardly from the center point, and in some embodiments, the arrays may be positioned within a housing. For example, referring to FIG. 6A, a transducer assembly 350 comprises six sonar transducer arrays, and the six sonar transducer arrays are configured in a triangular stacked arrangement. A first three sonar transducer arrays 354 may lay in a first plane, while a second three sonar transducer arrays 352 may lay in a second plane. The first three sonar transducer arrays 354 and the second three sonar transducer arrays 352 may be oriented such that the points of the triangular shape of the first three sonar transducer arrays 354 do not overlap the points of the triangular shape of the second three sonar transducer arrays 352. In the embodiment shown in FIG. 6A, the first three sonar transducer arrays 354 all lay in a first plane, e.g., parallel to a surface of a body of water, and the second three sonar transducer arrays 352 lay in a second plane, e.g., also parallel to the surface of the body of water; and the first and second planes are separated by a distance, such as 3 inches, 6 inches, 2 cm, 5 cm, 2 mm, etc. In other embodiments, the six (or more) sonar transducer arrays may lay in more than two planes which may or may not be parallel to a surface of a body of water. Along similar lines, more than 2 triangular (or other shapes) could be provided. Further, the first and second three sonar transducer arrays 354, 352 may be oriented in any other manner with respect to each other.

Referring now to FIG. 6B, a transducer assembly 356 comprises eight sonar transducer arrays, and the eight sonar transducer arrays may be configured in a rectangular stacked arrangement. A first four sonar transducer arrays 358 may lay in a first plane, while a second four sonar transducer arrays 360 may lay in a second plane. The first four sonar transducer arrays 358 and the second four sonar transducer arrays 360 may be oriented such that the points of the rectangular shape of the first four sonar transducer arrays 358 do not overlap the points of the rectangular shape of the second four sonar transducer arrays 360. In the embodiment shown in FIG. 6B, the first four sonar transducer arrays 358 all lay in a first plane, e.g., parallel to a surface of a body of water, and the second four sonar transducer arrays 360 lay in a second plane, e.g., also parallel to the surface of the body of water, and the first and second planes are separated by a distance, such as 3 inches, 6 inches, 2 cm, 5 cm, 2 mm, etc. In other embodiments, the eight sonar transducer arrays may lay in more or less than two planes which may or may not be parallel to a surface of a body of water. Along similar lines, more than 2 squares (or other shapes) could be provided. Further, the first and second three sonar transducer arrays 358, 360 may be oriented in any other manner with respect to each other.

Referring now to FIG. 6C, a transducer assembly 362 comprises twelve sonar transducer arrays, and the twelve sonar transducer arrays are configured in a hexagonal stacked arrangement. A first six sonar transducer arrays 364 may lay in a first plane, while a second six sonar transducer arrays 366 may lay in a second plane. The first six sonar transducer arrays 364 and the second six sonar transducer arrays 366 may be oriented such that the points of the hexagonal shape of the first six sonar transducer arrays 364 do not overlap the points of the hexagonal shape of the second six sonar transducer arrays 366. In the embodiment shown in FIG. 6C, the first six sonar transducer arrays 364 all lay in a first plane, e.g., parallel to a surface of a body of water, and the second six sonar transducer arrays 366 lay in a second plane, e.g., also parallel to the surface of the body of water, and the first and second planes are separated by a distance, such as 3 inches, 6 inches, 2 cm, 5 cm, 2 mm, etc. In other embodiments, the twelve sonar transducer arrays may lay in more or less than two planes which may or may not be parallel to a surface of a body of water. Along similar lines, more than 2 hexagons (or other shapes) could be provided. Further, the first and second three sonar transducer arrays 364, 366 may be oriented in any other manner with respect to each other.

Referring next to FIG. 6D, a transducer assembly 368 comprises eight sonar transducer arrays 370, and the eight sonar transducer arrays 370 are configured in an octagonal arrangement. In the embodiment shown in FIG. 6D, the eight sonar transducer arrays in the transducer assembly 368 lay in a same plane. For example, the transducer assembly 368 may be configured similar (or identical) to the embodiment shown in FIGS. 3-5. In other embodiments, the eight sonar transducer arrays may lay in more than one plane which may or may not be parallel to a surface of a body of water. Further, the eight sonar transducer arrays may be oriented in any other manner with respect to each other.

Referring next to FIG. 6E, a transducer assembly 369 comprises eight sonar transducer arrays 367*a*. 367*b* . . . 367*g*. Notably, the eight sonar transducer arrays 367*a*, 367*b* . . . 367*g* are stacked in multiple "star" style configurations, specifically shown as two eight leg stars where four arrays form an eight leg star. The two eight leg stars are stacked in different planes relative to each other. Notably, however, the transducer arrays are directed to provide 360-degree coverage as described herein. For example, transducer array 367*a* is aimed to the left, while transducer array 367*b* is aimed to the right.

Referring now to FIG. 6F, a transducer assembly 372 comprises one or more sonar transducer arrays configured in a circumferential configuration 374. In some embodiments, the one or more sonar transducer arrays may all lay in the same plane. In other embodiments, the one or more sonar transducer arrays may lay in different planes. For example, the one or more sonar transducer arrays may be configured in a spiralized cylindrical pattern along the circumferential configuration 374. Further, the one or more sonar transducer arrays may be oriented in any other manner with respect to each other within the circumferential configuration 374.

Figure 7C:
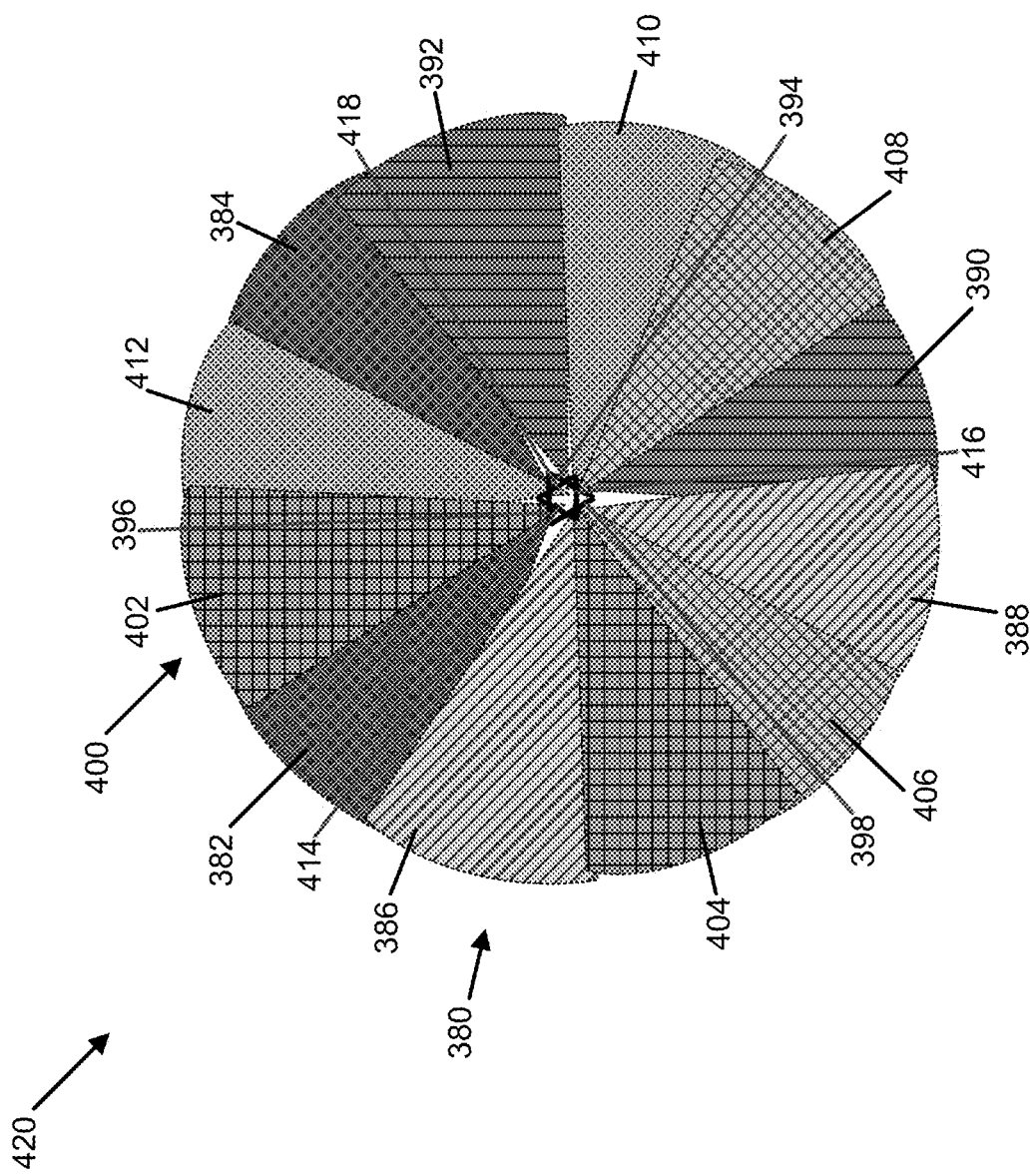
FIG. 7C illustrates an example arrangement of the first layer of arrays shown in FIG. 7A and the second layer of arrays shown in FIG. 7B to provide 360-degree sonar coverage utilizing beamformed sonar return beams, in accordance with some embodiments discussed herein.

FIGS. 7A-7C illustrate an example transducer assembly 420 with six sonar transducer arrays arranged in a triangular stacked configuration, such as shown in FIG. 6A. In some embodiments, the arrays are positioned within a housing. As best shown in FIG. 7A, the transducer assembly 420 comprises three first sonar transducer arrays 380 (sonar transducer arrays 394, 396, and 398) arranged in a same plane in a triangular configuration. The three first sonar transducer arrays 380 are positioned in a circumferential pattern around a center point such that the arrays are aimed outwardly and downwardly from the center point (although any direction is contemplated, such as just outwardly). Each of the three first sonar transducer arrays 380 are configured to produce two ranges of angles with a gap in between. For example, the first array 394 is oriented with a facing direction so as to produce a first range of angles 390 and a second range of angles 392 (with a gap in between). The second array 396 is oriented with a facing direction so as to produce a first range of angles 384 and a second range of angles 382 (with a gap in between). The third array 398 is oriented with a facing direction so as to produce a first range of angles 386 and a second range of angles 388 (with a gap in between).

As best shown in FIG. 7B, the transducer assembly 420 comprises three second sonar transducer arrays 400 (sonar transducer arrays 414, 416, and 418) arranged in a same plane in a triangular configuration. In some embodiments, the plane in which the three second sonar transducer arrays 400 lay is parallel to the plane in which the three first sonar transducer arrays 380 lay. The three second sonar transducer arrays 400 are positioned in a circumferential pattern around a center point such that the arrays are aimed outwardly and downwardly from the center point (although any direction is contemplated, such as just outwardly). Each of the three second sonar transducer arrays 400 are configured to produce two ranges of angles with a gap in between. For example, the first array 414 is oriented with a facing direction so as to produce a first range of angles 402 and a second range of angles 404 (with a gap in between). The second array 416 is oriented with a facing direction so as to produce a first range of angles 406 and a second range of angles 408 (with a gap in between). The third array 418 is oriented with a facing direction so as to produce a first range of angles 410 and a second range of angles 412 (with a gap in between).

As best shown in FIG. 7C, the three first sonar transducer arrays 380 and the three second sonar transducer arrays 400 are arranged in a stacked configuration. More specifically, in the embodiment shown in FIG. 7C, the three first sonar transducer arrays 380 and the three second sonar transducer arrays 400 are arranged such that the peaks of the triangular shape of the three first sonar transducer arrays 380 are offset from the peaks of the triangular shape of the three second sonar transducer arrays 400. This configuration causes the ranges of angles of the three first sonar transducer arrays 380 and the three second sonar transducer arrays 400 to fit together so as to provide 360-degree coverage. For example, the ranges of angles 402 and 412 of the arrays 414 and 418, respectively, are oriented such that they cover the gap between the ranges of angles 382 and 384 of the array 396. The ranges of angles 410 and 408 of the arrays 418 and 416, respectively, are oriented such that they cover the gap between the ranges of angles 392 and 390 of the array 394. The ranges of angles 404 and 406 of the arrays 414 and 416, respectively, are oriented such that they cover the gap between ranges of angles 386 and 388 of the array 398. Similarly, the ranges of angles 386 and 382 of the arrays 398 and 396, respectively, are oriented such that they cover the gap between ranges of angles 404 and 402 of the array 414. The ranges of angles 384 and 392 of the arrays 396 and 394, respectively, are oriented such that they cover the gap between ranges of angles 412 and 410 of the array 418. The ranges of angles 390 and 388 of the arrays 394 and 398, respectively, are oriented such that they cover the gap between ranges of angles 408 and 406 of the array 416.

Although the three first sonar transducer arrays 380 and the three second sonar transducer arrays 400 are separated such that the three first sonar transducer arrays 380 lay in a first plane and the three second sonar transducer arrays 400 lay in a second plane, the ranges of angles are still able to cover the gaps between other ranges of angles to form the 360-degree view shown in FIG. 7C. That is, the distance between the planes in which the three first sonar transducer arrays 380 and the three second sonar transducer arrays 400 lay is small enough such that the ranges of angles converge into the 360-degree coverage at an appropriate distance from a center point of the transducer assembly 420. For example, in some embodiments, the distance between the planes in which the three first sonar transducer arrays 380 and the three second sonar transducer arrays 400 lay may be approximately three inches. In other embodiments, however, the distance may be more or less than three inches.

Figure 8A:
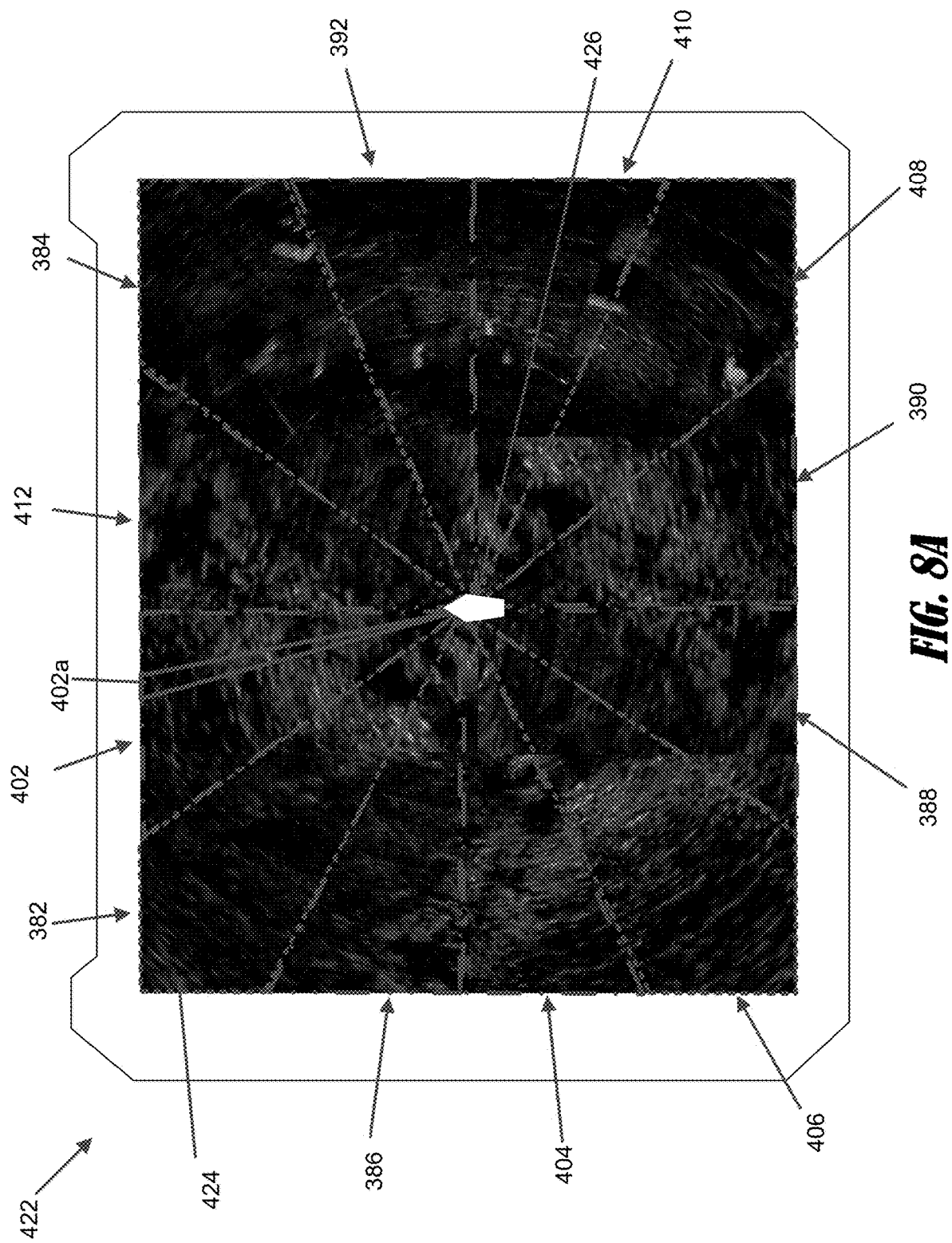
FIG. 8A shows an example marine electronic device presenting a 360-degree live sonar image, in accordance with some embodiments discussed herein.

In some embodiments, the arrays can be used to form 360-degree live (or substantially real-time) sonar images. For example, FIG. 8A illustrates a 360-degree live sonar image 424 presented on a display of a marine electronics device 422. The 360-degree live sonar image 424 illustrates a depiction of the underwater environment with a watercraft icon 426 overtop. The 360-degree live sonar image 424 is formed as slices of sonar return data corresponding to each sonar return beam extending within a sonar beam coverage. For example, the 360-degree live sonar image 424 may be formed as slices of sonar return data corresponding to each sonar return beams extending within the sonar beam coverages defined by the ranges of angles 412, 384, 392, 410, 408, 390, 388, 406, 404, 386, 382, and 402 shown in FIGS. 7A-7C (which are illustrated overlaid on the sonar image 424 in FIG. 8A). To further explain, each slice of sonar beam coverage (e.g., slice 402a) within each range of angles can be formed into sonar imagery and placed on the screen simultaneously to form the 360-degree sonar image 424. In this regard, the 360-degree live sonar image 424 can be updated in substantially real-time all at once as it was all received at substantially the same time (e.g., by selecting different frequencies to form all the different sonar return beams that are used to present sonar return data into the image at the proper angle). Notably, any number of ranges of angles may be used to form the sonar image-such as generated by other transducer array arrangements, some of which may described herein.

Figure 8C:
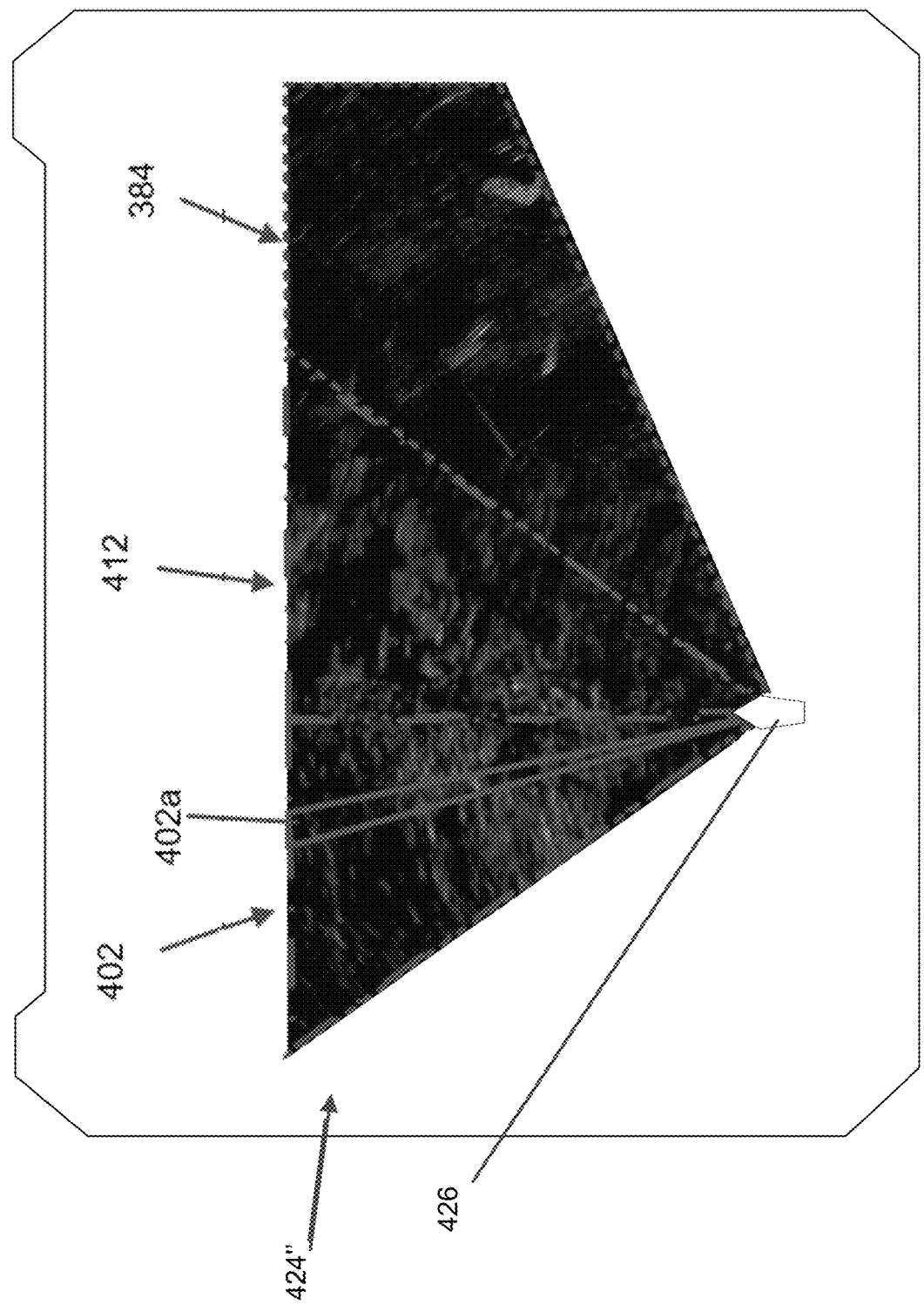
FIG. 8C shows the marine electronic device presenting a zoomed-in view of the partial 360-degree live sonar image shown in FIG. 8B, in accordance with some embodiments discussed herein.

Further, in some embodiments, the arrays can be used to form partial (e.g., less than 360-degree) live (or substantially real-time) sonar images. In some embodiments, the partial live sonar image may be formed as slices of sonar return data corresponding to some of all of the available sonar return beams (e.g., including full or partial portions of ranges of angles). For example, with reference to FIG. 8B, a partial live sonar image 424' may be formed as slices of sonar return data corresponding to each sonar return beam extending within the sonar beam coverages defined by the ranges of angles 402, 412, and 384 in FIG. 7C. In this regard, the partial live sonar image can be updated in substantially real-time all at once as it was all received at substantially the same time (e.g., by selecting different frequencies to form all the different sonar return beams that are used to present sonar return data into the image at the proper angle(s)). In some embodiments, the system may be configured to present a zoomed-in version of the partial live sonar image, as more display space may be available. For example, FIG. 8C illustrates an example zoomed-in partial live sonar image 424".

Figure 8D:
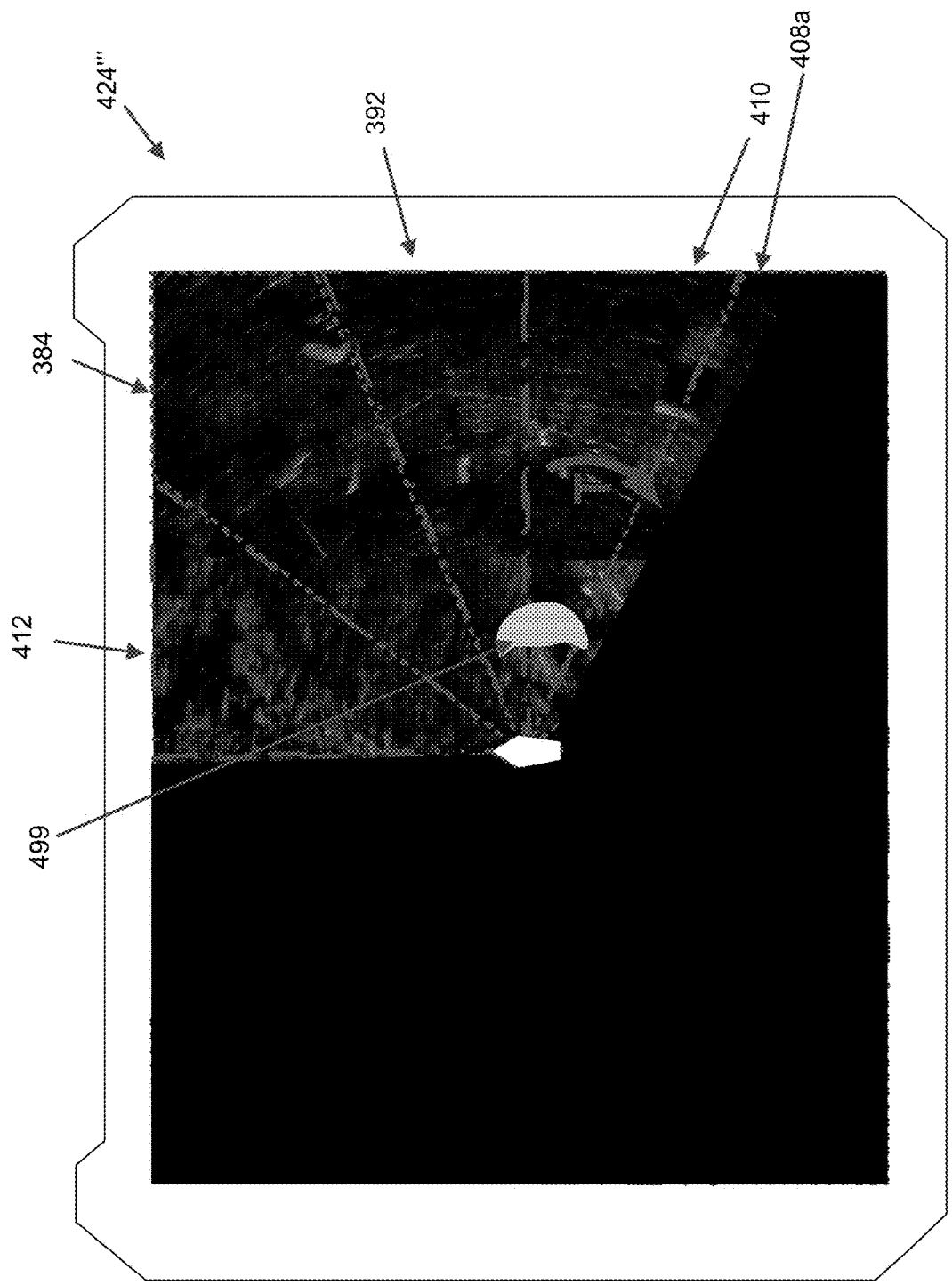
FIG. 8D shows the marine electronic device presenting a partial 360-degree live sonar image, the portion being shown having been rotated to track a target object, in accordance with some embodiments discussed herein.

In some embodiments, the user may select the portions of the 360-degree sonar image that will form the partial live sonar image. Such a selection may be made at the marine electronic device and may include any form of selection (e.g., using a finger to define the portion, selecting and/or inputting angles of the 360-degrees, among other ways). In some embodiments, the presented portions forming the partial live sonar image may be based on sweep pattern(s) and/or position(s) of desired target(s) within the underwater environment (e.g., stationary target(s) and/or moving target(s)). For example, with reference to FIG. 8D, a desired object 499 may be identified, and the sonar return data may be used to create the partial live sonar image by automatically and/or continually updating which portions of the sonar beam coverage to display such that the object 499 remains within the partial live sonar image over time. For example, the selected sonar beam slices for presentation have shifted clockwise (e.g., along arrow T). In this regard, the range of angles 412, 384, and 392 are presented along with a slice 408a from another range of angles 408. Notably, the object 499 is still shown in the partial live sonar image 424". In some embodiments, the user may select the object to be tracked, although the object may be automatically determined in other embodiments.

Referring now to FIGS. 9A-9C and 10, the sonar transducer arrays within the transducer assembly may each have a tilt angle with respect to a horizontal plane that is parallel to a surface of a body of water. For example, the sonar transducer assemblies 428, 430, and 432 shown in FIGS. 9A-9C have sonar transducer arrays oriented with tilt angles $A_1$, $A_2$, and $A_3$, respectively. Similarly, the sonar transducer assembly 440 in FIG. 10 has sonar transducer arrays that have tilt angles that vary, e.g., among tilt angles $A_1$, $A_2$, and $A_3$. In some embodiments, tilt angle $A_1$ may be approximately 6 degrees, tilt angle $A_2$ may be approximately 20 degrees, and tilt angle $A_3$ may be approximately 40 degrees. In other embodiments, the tilt angles $A_1$, $A_2$, and $A_3$ may be any other value.

Figures 9A, 9B, 9C:
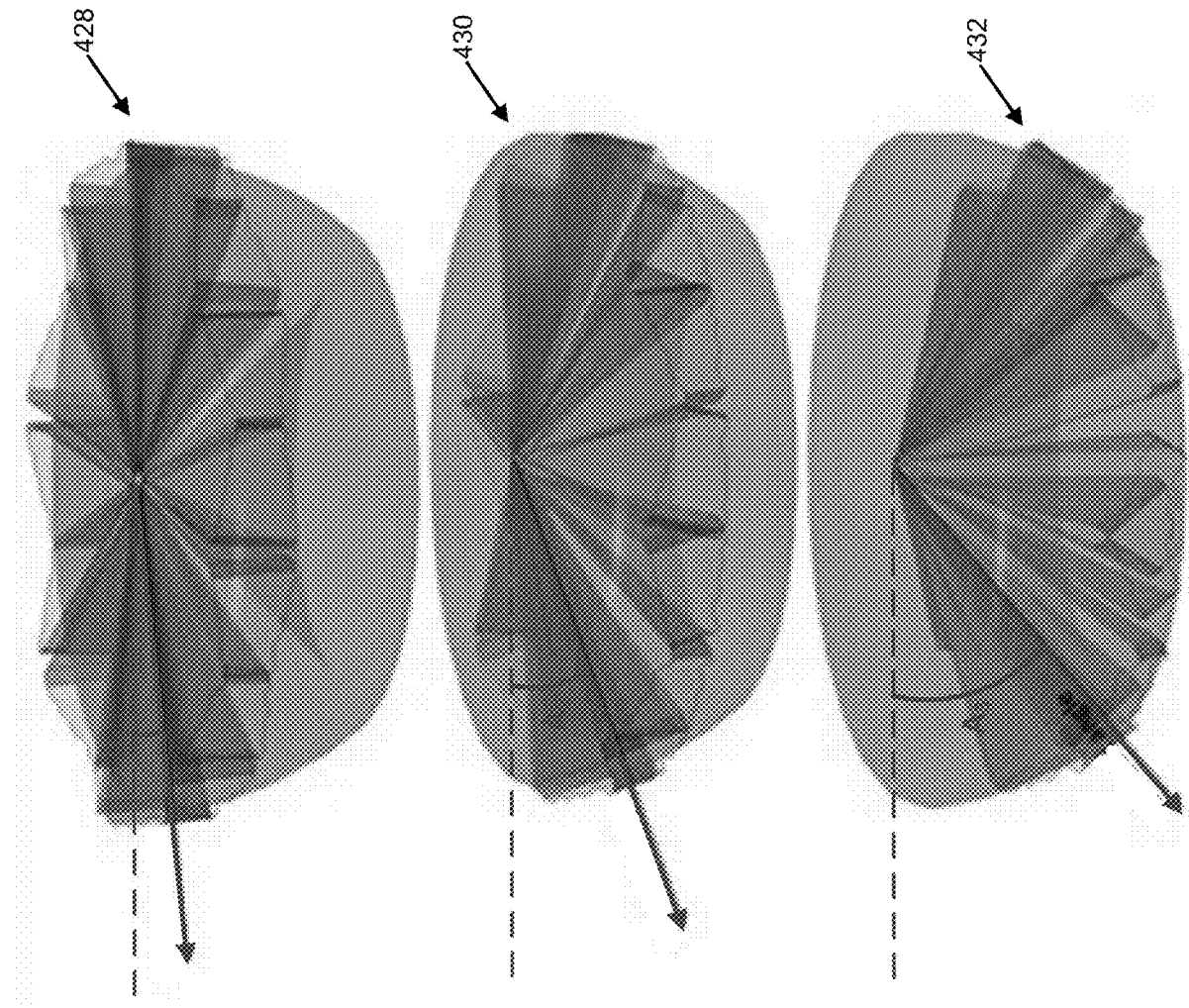
FIG. 9A illustrates a perspective view of example sonar beam coverage of an example arrangement of eight arrays positioned at an example tilt angle, along with their corresponding ranges of angles of beamformed sonar return beams, in accordance with some embodiments discussed herein.
FIG. 9B illustrates a perspective view of example sonar beam coverage of an example arrangement of eight arrays positioned at an example tilt angle, along with their corresponding ranges of angles of beamformed sonar return beams, in accordance with some embodiments discussed herein.
FIG. 9C illustrates a perspective view of example sonar beam coverage of an example arrangement of eight arrays positioned at an example tilt angle, along with their corresponding ranges of angles of beamformed sonar return beams, in accordance with some embodiments discussed herein.

In some embodiments, the tilt angles of all of the sonar transducer arrays may be the same. Further, in some embodiments, the sonar transducer arrays may have fixed tilt angles, such as shown in FIGS. 9A-9C, and in other embodiments, the sonar transducer arrays may be adjustable such that their tilt angles are variable, such as shown in FIGS. 10A-C. For example, some embodiments may have a tilt mechanism, such as an umbrella, cable, or cam mechanism, that is configured to allow for the transducer assembly to achieve different tilt angles by simultaneously tilting the facing direction of all of the transducer arrays. With reference to FIG. 10A, an example tilt mechanism 401 includes a pull rod 405 that is connected to each transducer array 409a, 409b via legs 403a, 403b, respectively. By pulling upwardly (e.g., as indicated by the arrow U1) in FIG. 10B, the transducer arrays adjust tilt angle to tilt angle $A_2$. Further upward movement of the pull rod 405 (such as indicated by arrow U2 in FIG. 10C) causes the transducer arrays to adjust tilt angle to tilt angle $A_3$. In embodiments in which the sonar transducer arrays are adjustable such that their tilt angles are variable, a sonar system may be configured to update the frequencies of the sonar transducer arrays based on tilt angle such that 360-degree coverage is maintained for all tilt angles. For example, referring back to FIG. 7C, the frequencies of the sonar transducer arrays may have to be adjusted along with the tilt angles such that the range of angles converge into a 360-degree view at an appropriate distance from a center of the transducer assembly at every tilt angle.

In some embodiments, a housing in which the sonar transducer arrays are positioned may be configured to move in a vertical direction with respect to a watercraft. This may allow for more optimal sonar coverage to be achieved in different underwater environments. For example, if the watercraft is located near a dock, the housing may be lowered from the watercraft in the vertical direction so that the dock does not block the sonar coverage.

Example System Architecture

FIG. 11 shows a block diagram of an example sonar system 500 of various embodiments described herein. The illustrated sonar system 500 includes a marine electronic device 505 and a transducer assembly 562, although other systems and devices may be included in various example systems described herein. In this regard, the system 500 may include any number of different systems, modules, or components; each of which may comprise any device or means embodied in either hardware, software, or a combination of hardware and software configured to perform one or more corresponding functions described herein.

The marine electronic device 505 may include a processor 510, a memory 520, a user interface 535, a display 540, one or more sensors (e.g., position sensor 545, other sensors 547, etc.), and a communication interface 530. One or more of the components of the marine electronic device 505 may be located within a housing or could be separated into multiple different housings (e.g., be remotely located).

The processor 510 may be any means configured to execute various programmed operations or instructions stored in a memory device (e.g., memory 520) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 510 as described herein. In this regard, the processor 510 may be configured to analyze electrical signals communicated thereto to provide or receive sonar data, sensor data, location data, and/or additional environmental data. For example, the processor 510 may be configured to receive sonar return data, generate sonar image data, and generate one or more sonar images based on the sonar image data.

In some embodiments, the processor 510 may be further configured to implement sonar signal processing, such as in the form of a sonar signal processor (although in some embodiments, portions of the processor 510 or the sonar signal processor could be located within the transducer assembly 562). In some embodiments, the processor 510 may be configured to perform enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g., watercraft, etc.

In an example embodiment, the memory 520 may include one or more non-transitory storage or memory devices such as, for example, volatile and/or non-volatile memory that may be either fixed or removable. The memory 520 may be configured to store instructions, computer program code, marine data, such as sonar data, chart data, location/position data, and other data associated with the navigation system in a non-transitory computer readable medium for use, such as by the processor for enabling the marine electronic device 505 to carry out various functions in accordance with example embodiments of the present disclosure. For example, the memory 520 could be configured to buffer input data for processing by the processor 510. Additionally, or alternatively, the memory 520 could be configured to store instructions for execution by the processor 510.

The communication interface 530 may be configured to enable connection to external systems (e.g., an external network 502). In this manner, the marine electronic device 505 may retrieve stored data from a remote device 561 via the external network 502 in addition to or as an alternative to the onboard memory 520. Additionally or alternatively, the marine electronic device may transmit or receive data, such as sonar signals, sonar returns, sonar image data or the like to or from a transducer assembly 562. In some embodiments, the marine electronic device 505 may also be configured to communicate with other devices or systems (such as through the external network 502 or through other communication networks, such as described herein). For example, the marine electronic device 505 may communicate with a propulsion system of the watercraft (e.g., for autopilot control); a remote device (e.g., a user's mobile device, a handheld remote, etc.); or other system.

The marine electronic device 505 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. In this regard, numerous other peripheral devices (including other marine electronic devices or transducer assemblies) may be included in the system 500.

The position sensor 545 may be configured to determine the current position and/or location of the marine electronic device 505 (and/or the watercraft 100). For example, the position sensor 545 may comprise a global positioning system (GPS), bottom contour, inertial navigation system, such as machined electromagnetic sensor (MEMS), a ring laser gyroscope, or other location detection system.

The display 540, e.g., one or more screens, may be configured to present images and may include or otherwise be in communication with a user interface 535 configured to receive input from a user. The display 540 may be, for example, a conventional LCD (liquid crystal display), a touch screen display, mobile device, or any other suitable display known in the art upon which images may be displayed.

In some embodiments, the display 540 may present one or more sets of marine data (or images generated from the one or more sets of data). Such marine data includes chart data, radar data, weather data, location data, position data, orientation data, sonar data, or any other type of information relevant to the watercraft. In some embodiments, the display 540 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g., a map or navigational chart). Additionally, or alternatively, depth information, weather information, radar information, sonar information, or any other navigation system inputs may be applied to one another.

The user interface 535 may include, for example, a keyboard, keypad, function keys, mouse, scrolling device, input/output ports, touch screen, or any other mechanism by which a user may interface with the system.

Although the display 540 of FIG. 11 is shown as being directly connected to the processor 510 and within the marine electronic device 505, the display 540 could alternatively be remote from the processor 510 and/or marine electronic device 505. Likewise, in some embodiments, the position sensor 545 and/or user interface 535 could be remote from the marine electronic device 505.

The marine electronic device 505 may include one or more other sensors 547 configured to measure or sense various other conditions. The other sensors 547 may include, for example, an air temperature sensor, a water temperature sensor, a current sensor, a light sensor, a wind sensor, a speed sensor, or the like.

The transducer assembly 562 illustrated in FIG. 11 includes eight transducer arrays 567, 568, 569, 570, 571, 572, 573, and 574. In some embodiments, more or less transducer arrays could be included, or other transducer elements could be included. As indicated herein, the transducer assembly 562 may also include a sonar signal processor or other processor (although not shown) configured to perform various sonar processing. In some embodiments, the processor (e.g., processor 510 in the marine electronic device 505, a processor (or processor portion) in the transducer assembly 562, or a remote processor—or combinations thereof) may be configured to filter sonar return data and/or selectively control transducer elements of the transducer arrays. For example, various processing devices (e.g., a multiplexer, a spectrum analyzer, A-to-D converter, etc.) may be utilized in controlling or filtering sonar return data and/or transmission of sonar signals from the arrays 567, 568, 569, 570, 571, 572, 573, and 574.

The transducer assembly 562 may also include one or more other systems, such as various sensor(s) 566. For example, the transducer assembly 562 may include an orientation sensor, such as gyroscope or other orientation sensor (e.g., accelerometer, MEMS, etc.) that can be configured to determine the relative orientation of the transducer assembly 562 and/or the various arrays 567, 568, 569, 570, 571, 572, 573, and 574—such as with respect to a waterline, the top surface of the body of water, or other reference. In some embodiments, additionally or alternatively, other types of sensor(s) are contemplated, such as, for example, a water temperature sensor, a current sensor, a light sensor, a wind sensor, a speed sensor, or the like.

Example Flowchart(s) and Operations

Embodiments of the present disclosure provide methods, apparatus and computer program products for operating a sonar system according to various embodiments described herein. Various examples of the operations performed in accordance with embodiments of the present disclosure will now be provided with reference to FIG. 12.

FIG. 12 illustrates a flowchart according to example methods for operating a sonar system according to an example embodiment. The operations illustrated in and described with respect to FIG. 12 may, for example, be performed by, with the assistance of, and/or under the control of one or more of the processor 510, memory 520, communication interface 530, user interface 535, position sensor 545, other sensor 547, transducer assembly 562, display 540, and/or external network 502/remote device 561. The method 600 may include positioning at least six sonar transducer arrays, such as in a circumferential pattern, around a center point at operation 602. For example, the at least six sonar transducer arrays may be positioned to lay in a same plane, or the at least six sonar transducer arrays may be positioned in a stacked configuration and lay in different planes, as discussed herein. At operation 604, the method comprises receiving sonar return data from the at least six sonar transducer arrays. Then, at operation 606, the sonar return data is filtered to beamform multiple sonar return beams. At operation 608, the method may include forming a live sonar image. For example, the live sonar image formed may be a 360-degree live sonar image, or the live sonar image may be a partial (e.g., less than 360-degree) live sonar image. The method may further include identifying an object within the live sonar image at operation 610. Finally, at operation 612, the method may include adjusting formation of the live sonar image over time such that the object remains within the live sonar image. In some embodiments, operations 610 and 612 may be optional. In some embodiments, the method may include additional, optional operations, and/or the operations described above may be modified, removed, or augmented, such as in accordance with various example embodiments described herein.

FIG. 12 illustrates a flowchart of a system, method, and computer program product according to an example embodiment. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 520 and executed by, for example, the processor 510. As will be appreciated, any such computer program product may be loaded onto a computer or other programmable apparatus (for example, a marine electronic device 505) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 505) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the disclosure set forth herein may come to mind to one skilled in the art to which the disclosure pertains having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

The invention claimed is:

1. A sonar transducer assembly mountable to a watercraft, the sonar transducer assembly comprising:
   a housing;
   at least six sonar transducer arrays positioned within the housing in a circumferential pattern around a center point such that the at least six sonar transducer arrays are aimed outwardly and downwardly from the center point,
   wherein each of the at least six sonar transducer arrays comprises a plurality of transducer elements, wherein the plurality of transducer elements are configured to operate at a fixed phase shift and vary in frequency so as to enable beamforming multiple sonar return beams via frequency steering for receiving sonar return data from a portion of an underwater environment,
   wherein each of the at least six sonar transducer arrays are configured to beamform sonar return beams through a first range of angles and a second range of angles, wherein the first range of angles is separated from the second range of angles by a gap range of angles, and wherein the at least six sonar transducer arrays are positioned and aimed relative to each other so that each gap range of angles of a sonar transducer array is covered by a first range of angles or a second range of angles of at least one adjacently positioned sonar transducer array such that beamformed multiple sonar return beams from the at least six sonar transducer arrays collectively provide simultaneous sonar return data corresponding to 360-degree coverage of the underwater environment relative to the watercraft,
   wherein the at least six sonar transducer arrays are positioned and aimed relative to each other in series so that each gap range of angles of a sonar transducer array is covered by a combination of a first range of angles of a first adjacently positioned sonar transducer array and a second range of angles of a second adjacently positioned sonar transducer array opposite to the first adjacently positioned sonar transducer array to provide the 360-degree coverage.

2. The sonar transducer assembly of claim 1, wherein a first sonar transducer array of the at least six sonar transducer arrays is configured to beamform first sonar return beams through a first range of angles of the first sonar transducer array and a second range of angles of the first sonar transducer array, wherein the first range of angles of the first sonar transducer array is separated from the second range of angles of the first sonar transducer array by a first gap range of angles, wherein a second sonar transducer array of the at least six sonar transducer arrays is configured to beamform second sonar return beams through a third range of angles of the second sonar transducer array and a fourth range of angles of the second sonar transducer array, wherein the third range of angles of the second sonar transducer array is separated from the fourth range of angles of the second sonar transducer array by a second gap range of angles, wherein the third range of angles of the second sonar transducer array covers the first gap range of angles, and wherein the second range of angles of the first sonar transducer array covers the second gap range of angles.

3. The sonar transducer assembly of claim 1, wherein the sonar return data corresponding to the 360-degree coverage of the underwater environment is used to form sonar image data that is configured for presentation of a sonar image.

4. The sonar transducer assembly of claim 3, wherein the sonar image is generated using sonar return data from all of the at least six sonar transducer arrays.

5. The sonar transducer assembly of claim 3, wherein the sonar image is generated using sonar return data from a portion of the sonar return beams, and wherein the portion of the sonar return beams is determined based on user input.

6. The sonar transducer assembly of claim 5, wherein an object is identified within the sonar image, and wherein, over time, the portion of sonar return beams being used to generate the sonar image is adjusted automatically such that the object remains within the sonar image.

7. The sonar transducer assembly of claim 1, wherein each of the sonar return beams has a low frequency end and a high frequency end, wherein the at least six sonar transducer arrays are configured such that the low frequency end of each of the multiple sonar return beams is adjacent to a low frequency end of a first adjacent sonar beam and such that the high frequency end of each of the multiple sonar return beams is adjacent to a high frequency end of a second adjacent sonar beam.

8. The sonar transducer assembly of claim 1, wherein the assembly comprises eight sonar transducer arrays.

9. The sonar transducer assembly of claim 8, wherein the eight sonar transducer arrays are arranged within a horizontal plane, and wherein the horizontal plane is parallel to a surface of water.

10. The sonar transducer assembly of claim 1, wherein each of the at least six sonar transducer arrays has a tilt angle with respect to a horizontal plane that is parallel to a surface of water.

11. The sonar transducer assembly of claim 10, wherein the tilt angles of all of the at least six sonar transducer arrays are the same.

12. The sonar transducer assembly of claim 10, wherein the housing is configured to move the at least six sonar transducer arrays such that the tilt angle of each of the at least six sonar transducer arrays changes.

13. The sonar transducer assembly of claim 12, wherein the assembly further comprises a processor, and wherein the processor is configured to adjust frequencies of the pluralities of transducer elements based on the tilt angles.

14. The sonar transducer assembly of claim 12, wherein the housing comprises an umbrella mechanism that causes the at least six sonar transducer arrays to move such that the tilt angles change.

15. The sonar transducer assembly of claim 12, wherein the housing comprises a cam mechanism that causes the at least six sonar transducer arrays to move such that the tilt angles change.

16. The sonar transducer assembly of claim 12, wherein the housing comprises a cable mechanism that causes the at least six sonar transducer arrays to move such that the tilt angles change.

17. The sonar transducer assembly of claim 1, wherein the housing is movable in a vertical direction with respect to the watercraft.

18. A system for generating an image of an underwater environment, the system comprising:
  at least six sonar transducer arrays positioned in a circumferential pattern around a center point such that the at least six sonar transducer arrays are aimed outwardly and downwardly from the center point,
  wherein each of the at least six sonar transducer arrays comprises a plurality of transducer elements, wherein the plurality of transducer elements are configured to operate at a fixed phase shift and vary in frequency so as to enable beamforming multiple sonar return beams via frequency steering for receiving sonar return data from a portion of an underwater environment,
  wherein each of the at least six sonar transducer arrays are configured to beamform sonar return beams through a first range of angles and a second range of angles, wherein the first range of angles is separated from the second range of angles by a gap range of angles, and wherein the at least six sonar transducer arrays are positioned and aimed relative to each other so that each gap range of angles of a sonar transducer array is covered by a first range of angles or a second range of angles of at least one adjacently positioned sonar transducer array such that beamformed multiple sonar return beams from the at least six sonar transducer arrays collectively provide simultaneous sonar return data corresponding to 360-degree coverage of the underwater environment relative to the watercraft,
  wherein the at least six sonar transducer arrays are positioned and aimed relative to each other so that each gap range of angles of a sonar transducer array is covered by a combination of a first range of angles of a first adjacently positioned sonar transducer array and a second range of angles of a second adjacently positioned sonar transducer array opposite to the first adjacently positioned sonar transducer array.

19. A method for operating and creating a 360-degree live sonar image, the method comprising:
  receiving sonar return data from at least six sonar transducer arrays, wherein the at least six sonar transducer arrays are positioned in a circumferential pattern around a center point such that the at least six sonar transducer arrays are aimed outwardly and downwardly from the center point,
  wherein each of the at least six sonar transducer arrays comprises a plurality of transducer elements, wherein the plurality of transducer elements are configured to operate at a fixed phase shift and vary in frequency so as to enable beamforming multiple sonar return beams via frequency steering for receiving sonar return data from a portion of an underwater environment,
  wherein each of the at least six sonar transducer arrays are configured to beamform sonar return beams through a first range of angles and a second range of angles, wherein the first range of angles is separated from the second range of angles by a gap range of angles, and wherein the at least six sonar transducer arrays are positioned and aimed relative to each other so that each gap range of angles of a sonar transducer array is covered by a first range of angles or a second range of angles of at least one adjacently positioned sonar transducer array such that beamformed multiple sonar return beams from the at least six sonar transducer arrays collectively provide simultaneous sonar return data corresponding to 360-degree coverage of the underwater environment relative to the watercraft,
  wherein the at least six sonar transducer arrays are positioned and aimed relative to each other so that each gap range of angles of a sonar transducer array is covered by a combination of a first range of angles of a first adjacently positioned sonar transducer array and a second range of angles of a second adjacently positioned sonar transducer array opposite to the first adjacently positioned sonar transducer array; and
  generating a 360-degree sonar image based on the received sonar return data.

\* \* \* \* \*